(12) United States Patent
Burke et al.

(10) Patent No.: US 11,003,337 B2
(45) Date of Patent: *May 11, 2021

(54) EXECUTING SEARCH COMMANDS BASED ON SELECTION ON FIELD VALUES DISPLAYED IN A STATISTICS TABLE

(71) Applicant: SPLUNK INC., San Francisco, CA (US)

(72) Inventors: Cory Eugene Burke, San Bruno, CA (US); Katherine Kyle Feeney, Oakland, CA (US); Divanny I. Lamas, San Francisco, CA (US); Marc Vincent Robichaud, San Francisco, CA (US); Matthew G. Ness, Oakland, CA (US); Clara E. Lee, Pacifica, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,207

(22) Filed: Feb. 13, 2019

(65) Prior Publication Data
US 2019/0250797 A1 Aug. 15, 2019

Related U.S. Application Data

(63) Continuation of application No. 14/526,468, filed on Oct. 28, 2014, now Pat. No. 10,261,673.
(Continued)

(51) Int. Cl.
*G06F 17/00* (2019.01)
*G06F 3/0484* (2013.01)
(Continued)

(52) U.S. Cl.
CPC ........ *G06F 3/04842* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS 5,381,524 A  1/1995 Lewis et al.
5,594,673 A  1/1997 Coffin
(Continued)

OTHER PUBLICATIONS

Notice of Allowance dated Jun. 18, 2019 in U.S. Appl. No. 15/885,486, 5 pages.
(Continued)

*Primary Examiner* — Mustafa A Amin
(74) *Attorney, Agent, or Firm* — Shook, Hardy & Bacon L.L.P.

(57) ABSTRACT

In embodiments of statistics value chart interface cell mode drill down, a first interface displays in a table format that includes columns each with field values of an event field, and each column having a column heading of a different one of the event fields, and includes rows each with one or more of the field values, each field value in a row associated with a different one of the event fields, and having an aggregated metric that represents a number of events with field-value pairs that match all of the field values listed in a respective row and the corresponding event fields listed in the respective columns. A cell can be emphasized that includes one of the field values in a row that corresponds to one of the different event fields in a column, and in response, a menu displays options to transition to a second interface.

30 Claims, 21 Drawing Sheets

Related U.S. Application Data

(60) Provisional application No. 62/059,988, filed on Oct. 5, 2014, provisional application No. 62/059,989, filed on Oct. 5, 2014, provisional application No. 62/059,993, filed on Oct. 5, 2014, provisional application No. 62/060,545, filed on Oct. 6, 2014, provisional application No. 62/059,994, filed on Oct. 5, 2014, provisional application No. 62/060,551, filed on Oct. 6, 2014, provisional application No. 62/059,998, filed on Oct. 5, 2014, provisional application No. 62/060,560, filed on Oct. 6, 2014, provisional application No. 62/060,001, filed on Oct. 5, 2014, provisional application No. 62/060,567, filed on Oct. 6, 2014.

(51) Int. Cl.

| | | |
|---|---|---|
| *G06F 3/0482* | (2013.01) | |
| *G06F 16/22* | (2019.01) | |
| *G06F 16/242* | (2019.01) | |
| *G06F 16/248* | (2019.01) | |
| *G06F 16/25* | (2019.01) | |
| *G06F 16/951* | (2019.01) | |
| *G06F 16/2455* | (2019.01) | |
| *G06F 40/18* | (2020.01) | |
| *G06K 9/20* | (2006.01) | |
| *G06F 9/451* | (2018.01) | |

(52) U.S. Cl.
CPC .......... *G06F 16/221* (2019.01); *G06F 16/242* (2019.01); *G06F 16/248* (2019.01); *G06F 16/2455* (2019.01); *G06F 16/252* (2019.01); *G06F 16/951* (2019.01); *G06F 40/18* (2020.01); *G06K 9/2054* (2013.01); *G06F 9/451* (2018.02); *G06F 16/2425* (2019.01)

(56) References Cited

U.S. PATENT DOCUMENTS

| | | |
|---|---|---|
| 5,619,688 A | 4/1997 | Bosworth et al. |
| 5,625,812 A | 4/1997 | David |
| 5,760,770 A | 6/1998 | Bliss et al. |
| 5,787,411 A | 7/1998 | Groff et al. |
| 5,894,311 A | 4/1999 | Jackson |
| 5,966,712 A | 10/1999 | Sabatini et al. |
| 5,980,078 A | 11/1999 | Krivoshein et al. |
| 5,982,370 A | 11/1999 | Kamper |
| 6,072,493 A | 6/2000 | Driskell et al. |
| 6,282,551 B1 | 8/2001 | Anderson et al. |
| 6,430,584 B1 | 8/2002 | Comer et al. |
| 6,438,565 B1 | 8/2002 | Ammirato et al. |
| 6,493,703 B1 | 12/2002 | Knight et al. |
| 6,513,033 B1 | 1/2003 | Trauring |
| 6,553,317 B1 | 4/2003 | Lincoln et al. |
| 6,597,957 B1 | 7/2003 | Beakley |
| 6,626,959 B1 | 9/2003 | Moise et al. |
| 6,691,254 B2 | 2/2004 | Kalert et al. |
| 6,768,997 B2 | 7/2004 | Schirmer et al. |
| 6,775,682 B1 | 8/2004 | Ballamkonda et al. |
| 6,851,088 B1 | 2/2005 | Conner et al. |
| 7,034,710 B2 | 4/2006 | Falada et al. |
| 7,131,037 B1 | 10/2006 | LeFaive et al. |
| 7,190,382 B1 | 3/2007 | Retlich et al. |
| 7,324,108 B2 | 1/2008 | Hild et al. |
| 7,461,077 B1 | 12/2008 | Greenwood |
| 7,480,647 B1 | 1/2009 | Murstein et al. |
| 7,583,187 B1 | 9/2009 | Cheng et al. |
| 7,640,496 B1 | 12/2009 | Chaulk et al. |
| 7,703,026 B2 | 4/2010 | Bechtold et al. |
| 7,750,910 B2 | 7/2010 | Hild et al. |
| 7,800,613 B2 | 9/2010 | Hanrahan et al. |
| 7,925,660 B2 | 4/2011 | Dieberger et al. |
| 8,140,563 B2 | 3/2012 | Midgley |
| 8,150,815 B2 | 4/2012 | Vian et al. |
| 8,150,960 B2 | 4/2012 | Kumbalimutt |
| 8,296,412 B2 | 10/2012 | Secor et al. |
| 8,429,630 B2 | 4/2013 | Nickolov et al. |
| 8,577,911 B1 | 11/2013 | Stepinski et al. |
| 8,583,631 B1 | 11/2013 | Ganapathi et al. |
| 8,682,925 B1 | 3/2014 | Marquardt et al. |
| 8,707,194 B1 | 4/2014 | Jenkins et al. |
| 8,712,993 B1 | 4/2014 | Ordonez |
| 8,751,529 B2 | 6/2014 | Zhang et al. |
| 8,752,014 B2 | 6/2014 | Harmon |
| 8,788,525 B2 | 7/2014 | Neels et al. |
| 8,874,502 B2 | 10/2014 | Williamson |
| 9,215,240 B2 | 12/2015 | Merza et al. |
| 9,244,899 B1 | 1/2016 | Greenbaum |
| 9,286,413 B1 | 3/2016 | Coates et al. |
| 9,424,333 B1 | 8/2016 | Bisignani et al. |
| 9,507,848 B1 | 11/2016 | Li et al. |
| 9,578,088 B2 | 2/2017 | Nickolov et al. |
| 9,921,730 B2 | 3/2018 | Burke et al. |
| 10,127,258 B2 | 11/2018 | Lamas et al. |
| 10,139,478 B2 | 11/2018 | Gaalema et al. |
| 10,139,997 B2 | 11/2018 | Burke et al. |
| 10,303,344 B2 | 5/2019 | Burke et al. |
| 10,444,956 B2 | 10/2019 | Burke et al. |
| 2002/0049713 A1 | 4/2002 | Khemlani et al. |
| 2002/0194166 A1 | 12/2002 | Fowler |
| 2003/0007009 A1 | 1/2003 | Haley |
| 2003/0100999 A1 | 5/2003 | Markowitz |
| 2003/0217043 A1 | 11/2003 | Weiss et al. |
| 2004/0001092 A1 | 1/2004 | Rothwein et al. |
| 2004/0010564 A1 | 1/2004 | Imaida et al. |
| 2004/0030741 A1 | 2/2004 | Wolton et al. |
| 2004/0186826 A1 | 9/2004 | Choi et al. |
| 2004/0236757 A1 | 11/2004 | Caccavale et al. |
| 2004/0254919 A1 | 12/2004 | Giuseppini |
| 2005/0015624 A1 | 1/2005 | Ginter et al. |
| 2005/0066027 A1 | 3/2005 | Hakiel et al. |
| 2005/0086187 A1 | 4/2005 | Grosser et al. |
| 2005/0086239 A1 | 4/2005 | Swann et al. |
| 2005/0091198 A1 | 4/2005 | Dettinger et al. |
| 2005/0154727 A1 | 7/2005 | O'Halloran et al. |
| 2005/0182722 A1 | 8/2005 | Meyer et al. |
| 2006/0069635 A1 | 3/2006 | Ram et al. |
| 2006/0100974 A1 | 5/2006 | Dieberger et al. |
| 2006/0143563 A1 | 6/2006 | Sauermann |
| 2006/0161581 A1 | 7/2006 | George et al. |
| 2006/0161816 A1 | 7/2006 | Gula et al. |
| 2006/0176284 A1 | 8/2006 | Cheng |
| 2006/0184529 A1 | 8/2006 | Berg et al. |
| 2006/0224995 A1 | 10/2006 | Treibach-Heck et al. |
| 2006/0253205 A1 | 11/2006 | Gardiner |
| 2007/0100471 A1 | 5/2007 | Kumar et al. |
| 2007/0100878 A1 | 5/2007 | Fielding et al. |
| 2007/0118491 A1 | 5/2007 | Baum et al. |
| 2007/0130585 A1 | 6/2007 | Perret et al. |
| 2007/0214164 A1 | 9/2007 | MacLennan et al. |
| 2007/0266149 A1 | 11/2007 | Cobb et al. |
| 2007/0280123 A1 | 12/2007 | Atkins et al. |
| 2008/0028340 A1 | 1/2008 | Davis |
| 2008/0046805 A1 | 2/2008 | Shewchenko et al. |
| 2008/0071580 A1 | 3/2008 | Marcus et al. |
| 2008/0086363 A1 | 4/2008 | Kass et al. |
| 2008/0091466 A1 | 4/2008 | Butler et al. |
| 2008/0104542 A1 | 5/2008 | Cohen et al. |
| 2008/0126030 A1 | 5/2008 | Jain et al. |
| 2008/0181123 A1 | 7/2008 | Huang et al. |
| 2008/0215546 A1 | 9/2008 | Baum et al. |
| 2008/0228442 A1 | 9/2008 | Lippincott et al. |
| 2008/0244582 A1 | 10/2008 | Brown et al. |
| 2008/0270369 A1 | 10/2008 | Myerson et al. |
| 2009/0164915 A1 | 6/2009 | Gasn et al. |
| 2009/0182769 A1 | 7/2009 | Feng |
| 2009/0192985 A1 | 7/2009 | Bolls et al. |
| 2009/0249248 A1 | 10/2009 | Burckart et al. |
| 2009/0299998 A1 | 12/2009 | Kim |
| 2009/0300544 A1 | 12/2009 | Psenka et al. |
| 2009/0327852 A1 | 12/2009 | MacGregor et al. |

(56) References Cited

U.S. PATENT DOCUMENTS

| | | |
|---|---|---|
| 2010/0030888 A1 | 2/2010 | Nawabzada et al. |
| 2010/0049692 A1 | 2/2010 | Astito et al. |
| 2010/0083151 A1 | 4/2010 | Lanza et al. |
| 2010/0122152 A1 | 5/2010 | Chamberlain et al. |
| 2010/0122194 A1 | 5/2010 | Rogers |
| 2010/0205521 A1 | 8/2010 | Folting |
| 2010/0211564 A1 | 8/2010 | Cohen et al. |
| 2010/0228752 A1 | 9/2010 | Folting et al. |
| 2010/0313127 A1 | 12/2010 | Gosper et al. |
| 2011/0032260 A1 | 2/2011 | Duggan et al. |
| 2011/0099500 A1 | 4/2011 | Smith et al. |
| 2011/0209040 A1 | 8/2011 | Zeine et al. |
| 2011/0261055 A1 | 10/2011 | Wong et al. |
| 2011/0264667 A1 | 10/2011 | Harizopoulos et al. |
| 2011/0302221 A1 | 12/2011 | Tobin et al. |
| 2011/0314148 A1* | 12/2011 | Petersen ............ G06F 11/3476 709/224 |
| 2012/0011474 A1 | 1/2012 | Kashik et al. |
| 2012/0072817 A1 | 3/2012 | Dubey et al. |
| 2012/0102396 A1 | 4/2012 | Arksey et al. |
| 2012/0124072 A1 | 5/2012 | Vaidyanathan et al. |
| 2012/0167006 A1 | 6/2012 | Tillert et al. |
| 2012/0192066 A1 | 7/2012 | Fox et al. |
| 2012/0198364 A1 | 8/2012 | Bornheimer et al. |
| 2012/0198365 A1 | 8/2012 | Bornheimer et al. |
| 2012/0198415 A1 | 8/2012 | Brandt |
| 2012/0246303 A1 | 9/2012 | Petersen et al. |
| 2012/0265727 A1 | 10/2012 | Naryzhnyy et al. |
| 2012/0265805 A1 | 10/2012 | Samdadiya et al. |
| 2012/0317016 A1 | 12/2012 | Hughes |
| 2013/0086587 A1 | 4/2013 | Naik et al. |
| 2013/0111576 A1 | 5/2013 | Devine et al. |
| 2013/0151491 A1 | 6/2013 | Gislason |
| 2013/0151563 A1 | 6/2013 | Addepalli et al. |
| 2013/0179793 A1 | 7/2013 | Duggan et al. |
| 2013/0179807 A1 | 7/2013 | Day |
| 2013/0212125 A1 | 8/2013 | Wierenga et al. |
| 2013/0282710 A1 | 10/2013 | Raghavan et al. |
| 2013/0283398 A1* | 10/2013 | Wu .......................... G06F 21/60 726/28 |
| 2013/0304547 A1 | 11/2013 | Adler et al. |
| 2013/0305183 A1 | 11/2013 | Kumagai et al. |
| 2013/0332387 A1 | 12/2013 | Mirra et al. |
| 2013/0332478 A1 | 12/2013 | Bornea et al. |
| 2013/0332862 A1 | 12/2013 | Mirra et al. |
| 2014/0006871 A1 | 1/2014 | Lakshmanan et al. |
| 2014/0032694 A1 | 1/2014 | Cohn et al. |
| 2014/0040343 A1 | 2/2014 | Nickolov et al. |
| 2014/0053070 A1* | 2/2014 | Powers .................. G06F 16/26 715/708 |
| 2014/0108437 A1 | 4/2014 | Brown et al. |
| 2014/0149393 A1 | 5/2014 | Bhatt et al. |
| 2014/0160238 A1 | 6/2014 | Yim et al. |
| 2014/0297666 A1 | 10/2014 | Morris |
| 2014/0304596 A1 | 10/2014 | Chandran et al. |
| 2014/0324862 A1 | 10/2014 | Bingham et al. |
| 2014/0344622 A1 | 11/2014 | Huang et al. |
| 2015/0019537 A1 | 1/2015 | Neels et al. |
| 2015/0058318 A1 | 2/2015 | Blackwell et al. |
| 2015/0095342 A1 | 4/2015 | Li et al. |
| 2015/0106748 A1 | 4/2015 | Monte |
| 2015/0109305 A1 | 4/2015 | Black |
| 2015/0294256 A1 | 10/2015 | Mahesh et al. |
| 2016/0098409 A1 | 4/2016 | Burke et al. |
| 2016/0098463 A1 | 4/2016 | Burke et al. |
| 2016/0188744 A1 | 6/2016 | Ito et al. |
| 2016/0275453 A1 | 9/2016 | Powers et al. |
| 2016/0321589 A1 | 11/2016 | Powers et al. |
| 2016/0350950 A1 | 12/2016 | Ritchie et al. |
| 2016/0357722 A1 | 12/2016 | Folting |
| 2017/0140039 A1 | 5/2017 | Neels et al. |
| 2019/0056853 A1 | 2/2019 | Burke et al. |
| 2019/0098106 A1 | 3/2019 | Mungel et al. |
| 2019/0250799 A1 | 8/2019 | Burke et al. |

OTHER PUBLICATIONS

Final Office Action dated Jul. 29, 2019 in U.S. Appl. No. 14/526,430, 10 pages.
Notice of Allowance dated Oct. 8, 2019 in U.S. Appl. No. 16/169,815, 12 pages.
Final Office Action dated Oct. 25, 2019 in U.S. Appl. No. 14/526,380, 56 pages.
Carasso, David, "Exploring Splunk", Search Processing Language (SPL) Primer and Cookbook, First Edition Published Apr. 2012, CITO Research, New York, New York, 156 pages.
Bitincka, Ledion, et al., "Optimizing Data Analysis with a Semi-Structured Time Series Database", splunk Inc., 2010 pp. 1-9.
Field Extractor App—SPLUNK (see https://www.youtube.com/watch?v=Gfl9Cm9v64Y video; dated Jul. 12, 2013; last accessed Jan. 21, 2016.
Non-Final Office Action dated Apr. 17, 2019 in U.S. Appl. No. 14/526,380, 35 pages.
"Display query system event subset—Bing," Retrieved from Internet URL: http://www.bing.com/search?q=display%20query%20system%20event%20subset&qs=n&f . . . , p. 1 (Apr. 4, 2016).
"vSphere Monitoring and Performance," Update 1, vSphere 5.5, EN-001357-00, accessed at https://web.archive.org/web/20140913043828/http://pubs.vmware.com/vsphere-55/topic/com.vmware.ICbase/PDF/vsphere-esxi-vcenter-server-551-monitoring-performance-guide.pdf, accessed on Sep. 9, 2019, pp. 174.
Non-Final Office Action dated Dec. 27, 2016 in U.S. Appl. No. 14/526,454, 47 pages.
Non-Final Office Action dated Mar. 2, 2017 in U.S. Appl. No, 14/526,430; 23 pages.
Non-Final Office Action dated Apr. 6, 2017 in U.S. Appl. No. 14/526,380, 38 pages.
Final Office Action dated Jun. 22, 2017 in U.S. Appl. No. 14/526,454, 31 pages.
Notice of Allowance dated Oct. 31, 2018 in U.S. Appl. No. 14/526,478, 2 pages.
Notice of Allowance dated Feb. 12, 2019 in U.S. Appl. No. 15/885,486, 8 pages.
Notice of Allowance dated Aug. 13, 2019 in U.S. Appl. No. 15/885,486, 2 pages.
Notice of Allowance dated Nov. 27, 2019 in U.S. Appl. No. 16/169,815, 2 pages.
Non-Final Office Action dated Jan. 7, 2020 in U.S. Appl. No. 14/526,430. 13 pages.
Screen captures from YouTube video clip entitled "Wrangling Big Data from the CPG Industry with Cloudera & Trifacta," 3 pages, uploaded on Oct. 20, 2014 by user "Trifacta". Retrieved from Internet: <https://www.youtube.com/watch?v=WuBjZzq8bWw>.
Kandel, S., Paepcke, A., Hellerstein, J., & Heer, J. (May 2011). Wrangler: Interactive visual specification of data transformation scripts. In Proceedings of the SIGCHI Conference on Human Factors in Computing Systems (pp. 3363-3372).
Incident Review Dashboard (2012). User Manual for Splunk Enterprise Security Version 2.0. Splunk Inc. 5 pages. Retrieved from the Internet <https://web.archive.org/web/20120712034303/http://docs.splunk.com/Documentation/ES/latest/User/IncidentReviewdashboard>.
Splunk Enterprise Security User Manual 2.0 (2012). Splunk Inc. 141 pages. Retrieved Oct. 14, 2016 from the Internet <https://web.archive.org/web/20120331145644/http://docs.splunk.com/Documentation/ES/latest/User/Overview>. 141 pages.
Bumgarner, Vincent, "Implementing Splunk: Big Data Reporting and Development for Operational Intelligence", Jan. 2013, 448 pages, Available at: http://2.droppdf.com/files/ug81f/implementing-splunk.pdf.
Splunk Cloud 8.0.2004 User Manual, available online, retrieved May 20, 2020 from docs.splunk.com, pp. 66.
Splunk Enterprise 8.0.0 Overview, available online, retrieved May 20, 2020 from docs.splunk.com, pp. 17.

(56) References Cited

OTHER PUBLICATIONS

Splunk Quick Reference Guide, updated 2019, available online at https://www.splunk.com/pdfs/solution-guides/splunk-quick-reference-guide.pdf, retrieved May 20, 2020, pp. 6.

* cited by examiner

```
Original Search: 501
search "error | stats count BY host

Sent to peers: 502
search "error | prestats count BY host (map)

Executed by search head: 503
Merge prestats results received from peers (reduce)
```

FIG. 5

| Data Summary | | | x |
|---|---|---|---|
| Hosts (5) \ Sources (8) \ Sourcetypes (3) | | | |
| filter | | | |
| Host ◊ | ▫ | Count ◊ | Last Update ◊ |
| mailsv | ▫⌄ | 9,829 | 4/29/14 1:32:47.000 PM |
| vendor_sales | ▫⌄ | 30,244 | 4/29/14 1:32:46.000 PM |
| www1 | ▫⌄ | 24,221 | 4/29/14 1:32:44.000 PM |
| www2 | ▫⌄ | 22,595 | 4/29/14 1:32:47.000 PM |
| www3 | ▫⌄ | 22,975 | 4/29/14 1:32:45.000 PM |

FIG. 6B

| Search | Pivot | Reports | Alerts | Dashboards | | | | | | | | Search & Reporting |
|---|---|---|---|---|---|---|---|---|---|---|---|---|

Q New Search

Save As ∨    Close sourcetype=access_combined          Search Bar 602                                              Time Range Picker 612    Date time range ∨

✓ 174 events (7/23/14 8:33:17.000 AM to 7/23/14 10:33:17.001 AM)                                                         Smart Mode ∨

Events (174)  Patterns  Statistics  Visualization
                                          Search Results Tabs 604

Format Timeline ∨   − Zoom Out   + Zoom to Selection   × Deselect                                          1 minute per column Timeline 605

List ∨   Format ∨   20 Per Page ∨                    ⟨Prev  1  2  3  4  5  6  7  8  9  ...  Next⟩

| ⟨ Hide Fields | ≡ All Fields | i | Time | Event |
|---|---|---|---|---|
| Selected Fields | | > | 7/23/14<br>9:33:17.000 AM | 92.233.220.234 - - [23/Jul/2014:09:33:17 -0700] "GET /wp-content/gallery/france/colomiers-custom.jpg<br>HTTP/1.1" 200179717 "https://www.google.co.uk/" Mozilla/5.0 (iPad; CPU OS 7_0_4 like Mac OS X)<br>AppleWebKit/537.51.1 (KHTML, Like Gecko) Version/7.0 Mobile/11B554a Safari/9537.53"<br>bytes = 179717 ; clientip = 92.233.220.234 ; host = www1 ; source = access_combined.log ; sourcetype =<br>access_combined |
| # bytes 71 | Fields | | | |
| a clientip 48 | Sidebar | | | |
| a host 1 | 606 | | | |
| a source 1 | | > | 7/23/14<br>9:33:04.000 AM | 183.60.212.148 - - [23/July/2014:09:33:04 -0700] "GET /?feed=rss2&p=321 HTTP/1.1" 200 752 "-" "Mozilla/<br>5.0 (compatible; EasouSpider; +http://search/spider.html)"<br>bytes = 752 ; clientip = 183.60.212.148 ; host = www1 ;source = access_combined.log ; sourcetype =<br>access_combined |
| a sourcetype 1 | | | | |
| Interesting Fields | | | | |
| # date_hour 2 | | > | 7/23/14<br>9:30:52.000 AM | 199.21.99.203 - - [23/Jul/?2014:09:30:52 -0700] "GET /wp-content/gallery/paris/thumbs/thumbs_celinemaria-<br>custom.jpg HTTP/1.1" 200 9605 "-" "Mozilla/5.0 (compatible; Yandeximages/3.0; +http://yandex.com/bots)"<br>bytes = 9605 ; clientip = 199.21.99.203 ; host = www1 ; source = access_combined.log ; <br>sourcetype = access_combined |
| # date_mday 1 | | | | |
| # date_minute 51 | | | | |
| a date_month 1 | | | | |
| # date_second 54 | | > | 7/23/14<br>9:28:28.000 AM | 157.55.39.203 - - [23/Jul/2014:09:30:28 -0700] "GET /?page_id=745&show=gallery&nggpage=2 HTTP/1.1"<br>200 43976 "-" "Mozilla/5.0 (compatible; bingbot/2.0; +http://www.bing.com/bingbot.htm)"<br>bytes = 43976 ; clientip = 157.55.39.203 ; host = www1 ; source = access_combined.log ;<br>sourcetype = access_combined |
| a date_wday 1 | | | | |
| # date_year 1 | | | | |
| # date_zone 1 | | > | 7/23/14<br>9:28:02.000 AM | 207.46.13.129 - - [23/Jul/2014:09:28:02 -0700] "GET /?p=15548&cpage=1 HTTP/1.1" 200 53235 "-" "Mozilla/<br>5.0 (compatible; bingbot/2.0; +http://www.bing.com/bingbot.htm)"<br>bytes = 53235 ; clientip = 207.46.13.129 ; host = www1 ; source = access_combined.log ;<br>sourcetype = access_combined |
| a file 43 | | | | |
| a ident 1 | | | | |
| # index 1 | | | | |
| # linecount 1 | | > | 7/23/14 | 89.248.168.164 - - [23/Jul/2014:09:27:41 -0700] "POST /xmlrpc.php HTTP/1.0" 200 370 "-" "Mozilla/4.0 (compatible: M |

Events List 608

*FIG. 6A*          Search Screen 600

FIG. 7B

Statistics Value Chart
Interface 800

Statistics Value Chart Interface 800

FIG. 8C

Events Interface 832

Statistics Value Chart
Interface 800

Statistics Value Chart
Interface 800

Statistics Time Chart
Interface 938

Statistics Time Chart
Interface 938

EXECUTING SEARCH COMMANDS BASED ON SELECTION ON FIELD VALUES DISPLAYED IN A STATISTICS TABLE

CROSS-REFERENCE TO RELATED APPLICATIONS

This application is a Continuation of U.S. application Ser. No. 14/526,468 filed Oct. 28, 2014 and entitled "Statistics Value Chart Interface Cell Mode Drill Down." U.S. application Ser. No. 14/526,468 itself claims priority to U.S. Provisional Patent Application Nos. 62/059,988; 62/059,989; 62/059,993; 62/059,994; 62/059,998; and 62/060,001 filed Oct. 5, 2014, and to U.S. Provisional Patent Application Nos. 62/060,545; 62/060,551; 62/060,560; and 62/060,567 filed Oct. 6, 2014. The disclosures of each of the foregoing applications being incorporated by reference herein in their entirety.

BACKGROUND

Data analysts for many businesses face the challenge of making sense of and finding patterns in the increasingly large amounts of data in the many types and formats that such businesses generate and collect. For example, accessing computer networks and transmitting electronic communications across the networks generates massive amounts of data, including such types of data as machine data and Web logs. Identifying patterns in this data, once thought relatively useless, has proven to be of great value to the businesses. In some instances, pattern analysis can indicate which patterns are normal and which ones are unusual. For example, detecting unusual patterns can allow a computer system manager to investigate the circumstances and determine whether a computer system security threat exists.

Additionally, analysis of the data allows businesses to understand how their employees, potential consumers, and/or Web visitors use the company's online resources. Such analysis can provide businesses with operational intelligence, business intelligence, and an ability to better manage their IT resources. For instance, such analysis may enable a business to better retain customers, meet customer needs, or improve the efficiency of the company's IT resources. Despite the value that one can derive from the underlying data described, making sense of this data to realize that value takes effort. In particular, patterns in underlying data may be difficult to identify or understand when analyzing specific behaviors in isolation, often resulting in the failure of a data analyst to notice valuable correlations in the data from which a business can draw strategic insight.

SUMMARY

This Summary introduces features and concepts of statistics value chart interface cell mode drill down, which is further described below in the Detailed Description and/or shown in the Figures. This Summary should not be considered to describe essential features of the claimed subject matter, nor used to determine or limit the scope of the claimed subject matter.

Statistics value chart interface cell mode drill down is described. In embodiments, a search system exposes a statistics value chart interface for display that includes columns each with field values of an event field, and each column having a column heading of a different one of the event fields, and includes rows each with one or more of the field values, each field value in a row associated with a different one of the event fields, and having an aggregated metric that represents a number of events with field-value pairs that match all of the field values listed in a respective row and the corresponding event fields listed in the respective columns. A cell can be emphasized that includes one of the field values in a row that corresponds to one of the different event fields in a column, and in response, a menu is displayed with options that are selectable. The menu includes the options to transition to second interface based on a selected one of the options.

In embodiments, each of the one or more rows in the statistics value chart interface include an aggregated metric that represents a number of events having field-value pairs matching the one or more field values listed in a respective row. The option to drill down into the statistics value chart interface excludes the field-value pairs that match the field value in the emphasized cell and the corresponding column from the statistics value chart interface. The events interface can display either a list of events that include the field-value pairs that match the field value of the emphasized cell, or other events that do not include the field-value pairs that match the field value of the emphasized cell. Alternatively, the events interface displays a list of events that include field-value pairs that match the one or more of the field values listed in the row with the emphasized cell, or other events that do not include field-value pairs that match the one or more of the field values listed in the row with the emphasized cell. Alternatively or in addition, the events interface displays a list of events that include the field-value pairs that match the field value of the emphasized cell and the field-value pairs that match the field values listed in the row to the left of the emphasized cell.

In embodiments, the options displayed in the menu include a view events option, an other events option, an exclude from results option, and a new search option. The view events option is selectable to transition to the events interface that displays the list of events that include the field-value pairs that match the field value of the emphasized cell. The other events option is selectable to transition to the events interface that displays the list of other events that do not include the field-value pairs that match the field value of the emphasized cell. The exclude from results option is selectable to drill down into the statistics value chart interface excluding the field value of the emphasized cell and the corresponding column. The new search option is selectable to create a new search based on the field value of the emphasized cell. Further, the menu includes a designation of a field-value pair that includes the field value of the emphasized cell. Alternatively, the menu includes a designation of a field-value pair that includes the field value of the emphasized cell, and the field values listed in the row to the left of the emphasized cell. Alternatively or in addition, the menu includes a designation of a field-value pair that includes the field value of the emphasized cell, and one or more of the field values listed in the row of the emphasized cell.

BRIEF DESCRIPTION OF THE DRAWINGS

Embodiments of statistics value chart interface cell mode drill down are described with reference to the following Figures. The same numbers may be used throughout to reference like features and components that are shown in the Figures:

FIG. 5 illustrates an exemplary search query received from a client and executed by search peers in accordance with the disclosed implementations.

FIG. 6A illustrates a search screen in accordance with the disclosed implementations.

FIG. 6B illustrates a data summary dialog that enables a user to select various data sources in accordance with the disclosed implementations.

FIG. 7B illustrates an incident review dashboard in accordance with the disclosed implementations.

FIGS. 8A-8E illustrate examples of statistics search interfaces in cell mode in accordance with the disclosed implementations.

DETAILED DESCRIPTION

Figure 1:
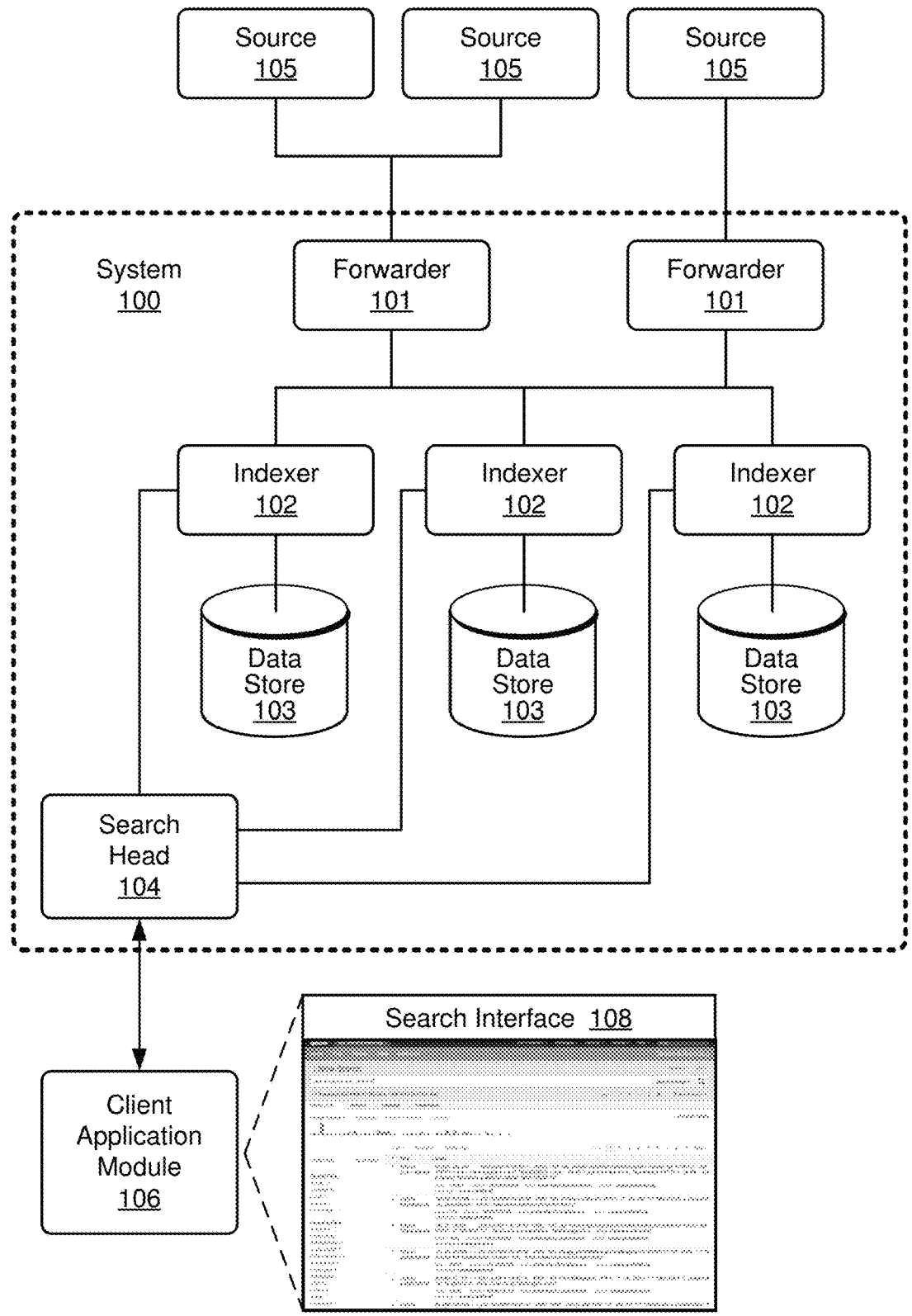
FIG. 1 illustrates a block diagram of an event-processing system in accordance with the disclosed implementations of statistics value chart interface cell mode drill down.

Embodiments of statistics interface cell mode search drill down are described and can be implemented to facilitate user-initiated search options when performing data searches in statistics value chart interfaces and statistics time chart interfaces. A statistics value chart interface includes columns each with field values of an event field, and each column having a column heading of a different one of the event fields, and includes rows each with one or more of the field values, each field value in a row associated with a different one of the event fields, and having an aggregated metric that represents a number of events with field-value pairs that match all of the field values listed in a respective row and the corresponding event fields listed in the respective columns. A cell can be emphasized that includes one of the field values in a row that corresponds to one of the different event fields in a column, and in response, a menu is displayed with options that are selectable. The menu includes the options to transition to second interface based on a selected one of the options.

Additionally, a statistics time chart interface includes columns each having a column heading comprising a different value, each different value associated with a particular event field, and includes one or more rows, each row having a time increment and aggregated metrics that each represent a number of events having a field-value pair that matches the different value represented in one of the columns and within the time increment over which the aggregated metric is calculated. A cell can be emphasized that includes one of the aggregated metrics in a row that includes the respective time increment, and in response, a stats event menu is displayed with event options that are selectable. The stats event menu includes the options to transition to a second interface based on a selected one of the options.

Example Environment

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," in which each event comprises a collection of performance data and/or diagnostic information that is generated by a computer system and is correlated with a specific point in time. Events can be derived from "time series data," in which time series data includes a sequence of data points (e.g., performance measurements from a computer system) that are associated with successive points in time and are typically spaced at uniform time intervals. Events can also be derived from "structured" or "unstructured" data. Structured data has a predefined format, in which specific data items with specific data formats reside at predefined locations in the data. For example, structured data can include data items stored in fields in a database table. In contrast, unstructured data does not have a predefined format. This means that unstructured data can include various data items having different data types that can reside at different locations. For example, when the data source is an operating system log, an event can include one or more lines from the operating system log containing raw data that includes different types of performance and diagnostic information associated with a specific point in time.

Examples of data sources from which an event may be derived include, but are not limited to web servers, application servers, databases, firewalls, routers, operating systems, and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, in which the flexible schema may be developed and redefined as needed. Note that a flexible schema may be applied to event data "on the fly" as desired (e.g., at search time), rather than at ingestion time of the data as in traditional database systems. Because the schema is not applied to event data until it is desired (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule includes a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques. Also, a number of "default fields" that specify metadata about the events, rather than data in the events themselves, can be created automatically. For example, such default fields can specify: a timestamp for the event data; a host from which the event data originated; a source of the event data; and a source type for the event data. These default fields may be determined automatically when the events are created, indexed, or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

Data Server System

FIG. 1 illustrates a block diagram of an example event-processing system 100, similar to the SPLUNK® ENTERPRISE system, and in which embodiments of statistics value chart interface cell mode drill down can be implemented. The example event-processing system 100 includes one or more forwarders 101 that collect data obtained from a variety of different data sources 105, and one or more indexers 102 that store, process, and/or perform operations on this data, in which each indexer operates on data contained in a specific data store 103. A search head 104 may also be provided that represents functionality to obtain and process search requests from clients and provide results of the search back to the clients, additional details of which are discussed in relation to FIGS. 3 and 4. The forwarders 101, indexers 102, and/or search head 104 may be configured as separate computer systems in a data center, or alternatively may be configured as separate processes implemented via one or more individual computer systems. Data that is collected via the forwarders 101 may be obtained from a variety of different data sources 105.

As further illustrated, the search head 104 may interact with a client application module 106 associated with a client device, such as to obtain search queries and supply search results or other suitable data back to the client application module 106 that is effective to enable the client application module 106 to form search user interfaces 108 through which different views of the data may be exposed. Various examples and details regarding search interfaces 108, client application modules 106, search queries, and operation of the various components illustrated in FIG. 1 are discussed throughout this document.

During operation, the forwarders 101 identify which indexers 102 will receive the collected data and then forward the data to the identified indexers. The forwarders 101 can also perform operations to strip out extraneous data and detect timestamps in the data. The forwarders next determine which of the indexers 102 will receive each data item and then forward the data items to the determined indexers 102. Note that distributing data across the different indexers 102 facilitates parallel processing. This parallel processing can take place at data ingestion time, because multiple indexers can process the incoming data in parallel. The parallel processing can also take place at search time, because multiple indexers can search through the data in parallel.

The example event-processing system 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Data Ingestion

Figure 2:
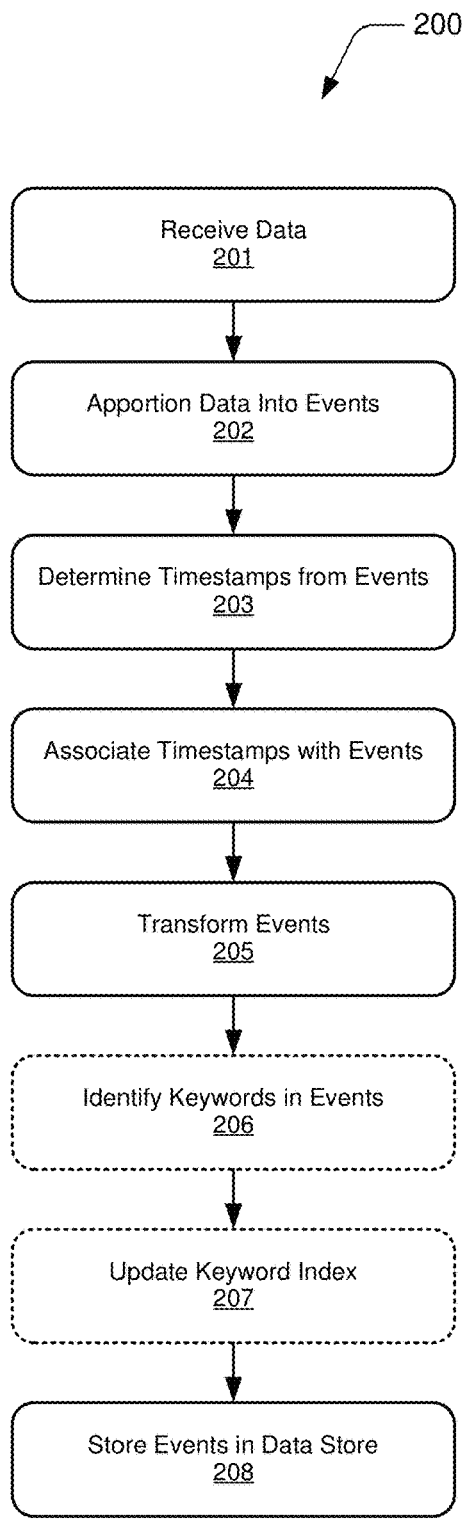
FIG. 2 illustrates a flowchart of how indexers process, index, and store data received from forwarders in accordance with the disclosed implementations.

FIG. 2 illustrates a flowchart 200 of how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, in which the indexer can be explicitly informed about the source of the data or can infer the source of the data by examining the data. These heuristic rules can include regular expression-based rules or delimiter-based rules for determining event boundaries, in which the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2" as a field-value pair.

Finally, the indexer stores the events in a data store at block 208, where a timestamp can be stored with each event to facilitate searching for events based on a time range. In some cases, the stored events are organized into a plurality of buckets, where each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on a hard disk.

Each indexer 102 is responsible for storing and searching a subset of the events contained in a corresponding data store 103. By distributing events among the indexers and data stores, the indexers can analyze events for a query in parallel, for example using map-reduce techniques, in which each indexer returns partial responses for a subset of events to a search head that combines the results to produce an answer for the query. By storing events in buckets for specific time ranges, an indexer may further optimize searching by looking only in buckets for time ranges that are relevant to a query. Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

Query Processing

Figure 3:
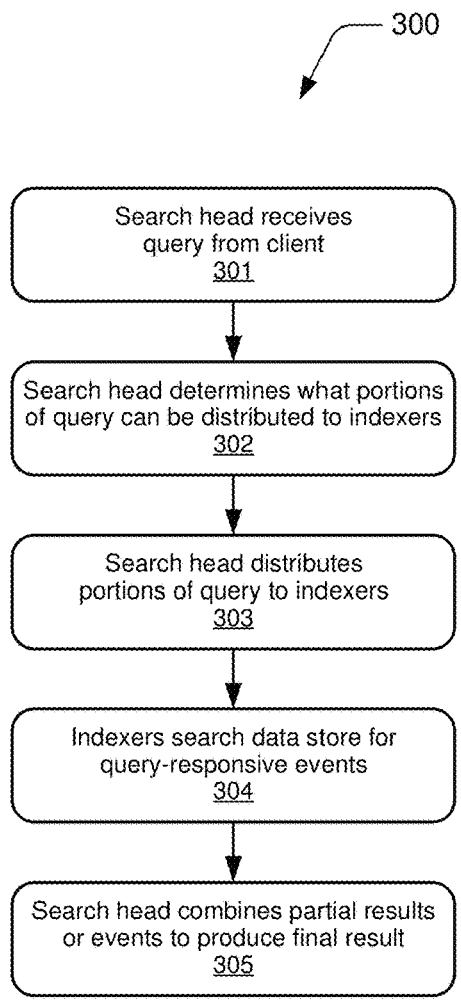
FIG. 3 illustrates a flowchart of how a search head and indexers perform a search query in accordance with the disclosed implementations.

FIG. 3 illustrates a flowchart 300 of how a search head and indexers perform a search query in accordance with the disclosed embodiments. At the start of this process, a search head receives a search query from a client (e.g., a client computing device) at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending on what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

Field Extraction

Figure 4:
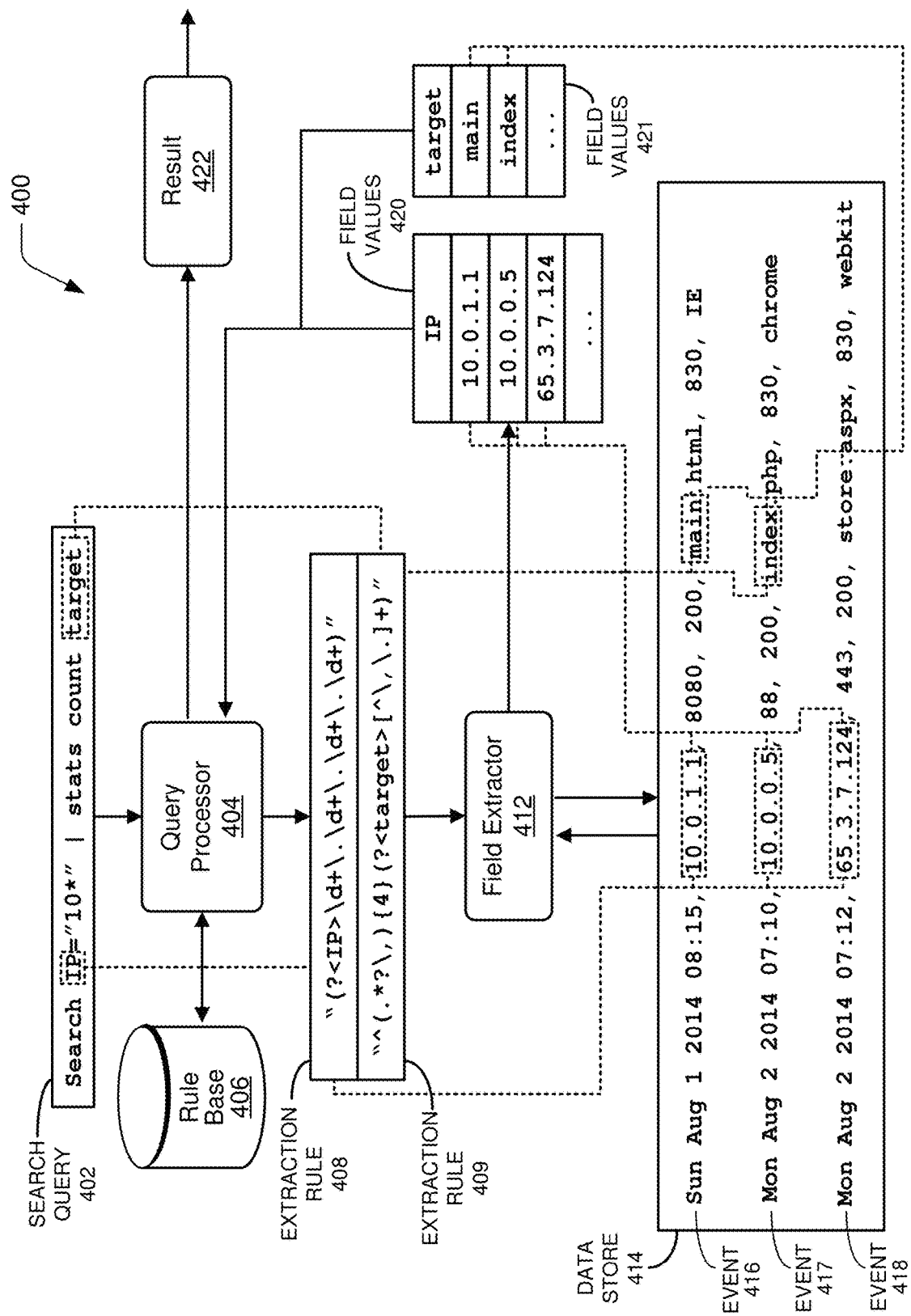
FIG. 4 illustrates a block diagram of a system for processing search requests that uses extraction rules for field values in accordance with the disclosed implementations.

FIG. 4 illustrates a block diagram 400 of how fields can be extracted during query processing in accordance with the disclosed embodiments. At the start of this process, a search query 402 is received at a query processor 404. The query processor 404 includes various mechanisms for processing a query, where these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. The SPL is a pipelined search language in which a set of inputs is operated on by a first command in a command line, and then a subsequent command following the pipe symbol "I" operates on the results produced by the first command, and so on for additional commands Search query 402 can also be expressed in other query languages, such as the Structured Query Language ("SQL") or any suitable query language.

Upon receiving the search query 402, the query processor 404 identifies that the search query 402 includes two fields, "IP" and "target." The query processor 404 also determines that the values for the "IP" and "target" fields have not already been extracted from events in a data store 414, and consequently determines that the query processor 404 needs to use extraction rules to extract values for the fields. Hence, the query processor 404 performs a lookup for the extraction rules in a rule base 406, in which rule base 406 maps field names to corresponding extraction rules and obtains extraction rules 408 and 409, where extraction rule 408 specifies how to extract a value for the "IP" field from an event, and extraction rule 409 specifies how to extract a value for the "target" field from an event.

As is illustrated in FIG. 4, the extraction rules 408 and 409 can include regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, the query processor 404 sends the extraction rules 408 and 409 to a field extractor 412, which applies the extraction rules 408 and 409 to events 416-418 in the data store 414. Note that the data store 414 can include one or more data stores, and the extraction rules 408 and 409 can be applied to large numbers of events in the data store 414, and are not meant to be limited to the three events 416-418 illustrated in FIG. 4. Moreover, the query processor 404 can instruct the field extractor 412 to apply the extraction rules to all of the events in the data store 414, or to a subset of the events that have been filtered based on some criteria.

Next, the field extractor 412 applies the extraction rule 408 for the first command "Search IP="10*"" to events in the data store 414, including the events 416-418. The extraction rule 408 is used to extract values for the IP address field from events in the data store 414 by looking for a pattern of one or more digits, followed by a period, followed again by one or more digits, followed by another period, followed again by one or more digits, followed by another period, and followed again by one or more digits. Next, the field extractor 412 returns field values 420 to the query processor 404, which uses the criterion IP="10*" to look for IP addresses that start with "10". Note that events 416 and 417 match this criterion, but event 418 does not, so the result set for the first command is events 416 and 417.

The query processor 404 then sends the events 416 and 417 to the next command "stats count target." To process this command, the query processor 404 causes the field extractor 412 to apply the extraction rule 409 to the events 416 and 417. The extraction rule 409 is used to extract values for the target field for the events 416 and 417 by skipping the first four commas in the events, and then extracting all of the following characters until a comma or period is reached. Next, the field extractor 412 returns field values 421 to the query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, the query results may include: a set of one or more events; a set of one or more values obtained from the events; a subset of the values; statistics calculated based on the values; a report containing the values; or a visualization, such as a graph or chart, generated from the values.

Example Search Screen

FIG. 6A illustrates an example of a search screen 600 in accordance with the disclosed embodiments. The search screen 600 includes a search bar 602 that accepts user input in the form of a search string. It also includes a date time range picker 612 that enables the user to specify a date and/or time range for the search. For "historical searches" the user can select a specific time range, or alternatively a relative time range, such as "today," "yesterday," or "last week." For "real-time searches," the user can select the size of a preceding time window to search for real-time events. The search screen 600 also initially displays a "data summary" dialog 610 as is illustrated in FIG. 6B that enables the user to select different sources for the event data, such as by selecting specific hosts and log files.

After the search is executed, the search screen 600 can display the results through search results tabs 604, where the search results tabs 604 include: an "Events" tab that displays various information about events returned by the search; a "Patterns" tab that can be selected to display various patterns about the events returned by the search; a "Statistics" tab that displays statistics about the search results and events; and a "Visualization" tab that displays various visualizations of the search results. The "Events" tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates an example 500 of how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head 104 when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

Keyword Index

As described above with reference to the flow charts 200 and 300 shown in respective FIGS. 2 and 3, the event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

High Performance Analytics Store

To speed up certain types of queries, some embodiments of system 100 make use of a high-performance analytics store, which is referred to as a "summarization table," that contains entries for specific field-value pairs. Each of these entries keeps track of instances of a specific value in a specific field in the event data and includes references to events containing the specific value in the specific field. For example, an entry in a summarization table can keep track of occurrences of the value "94107" in a "ZIP code" field of a set of events, where the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process each of the events that have a specific field-value combination, the system can use the references in the summarization table entry to directly access the events to extract further information without having to search each of the events to find the specific field-value combination at search time.

In some embodiments, the system maintains a separate summarization table for each of the above-described time-specific buckets that stores events for a specific time range, where a bucket-specific summarization table includes entries for specific field-value combinations that occur in events in the specific bucket. Alternatively, the system can maintain a separate summarization table for each indexer, in which the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover each of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. This is possible if results from preceding time periods can be computed separately and combined to generate an updated report. In some cases, it is not possible to combine such incremental results, for example where a value in the report depends on relationships between events from different time periods. If reports can be accelerated, the summarization engine periodically generates a summary covering data obtained during a latest non-overlapping time period. For example, where the query seeks events meeting a specified criteria, a summary for the time period includes only the events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated.

Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and in U.S. Pat. No. 8,412,696, issued on Apr. 2, 2011.

Security Features

The SPLUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations, and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, where the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. patent application Ser. Nos. 13/956,252, and 13/956,262. Security-related information can also include endpoint information, such as malware infection data and system configuration information, as well as access control information, such as login/logout information and access failure notifications. The security-related information can originate from various sources within a data center, such as hosts, virtual machines, storage devices, and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
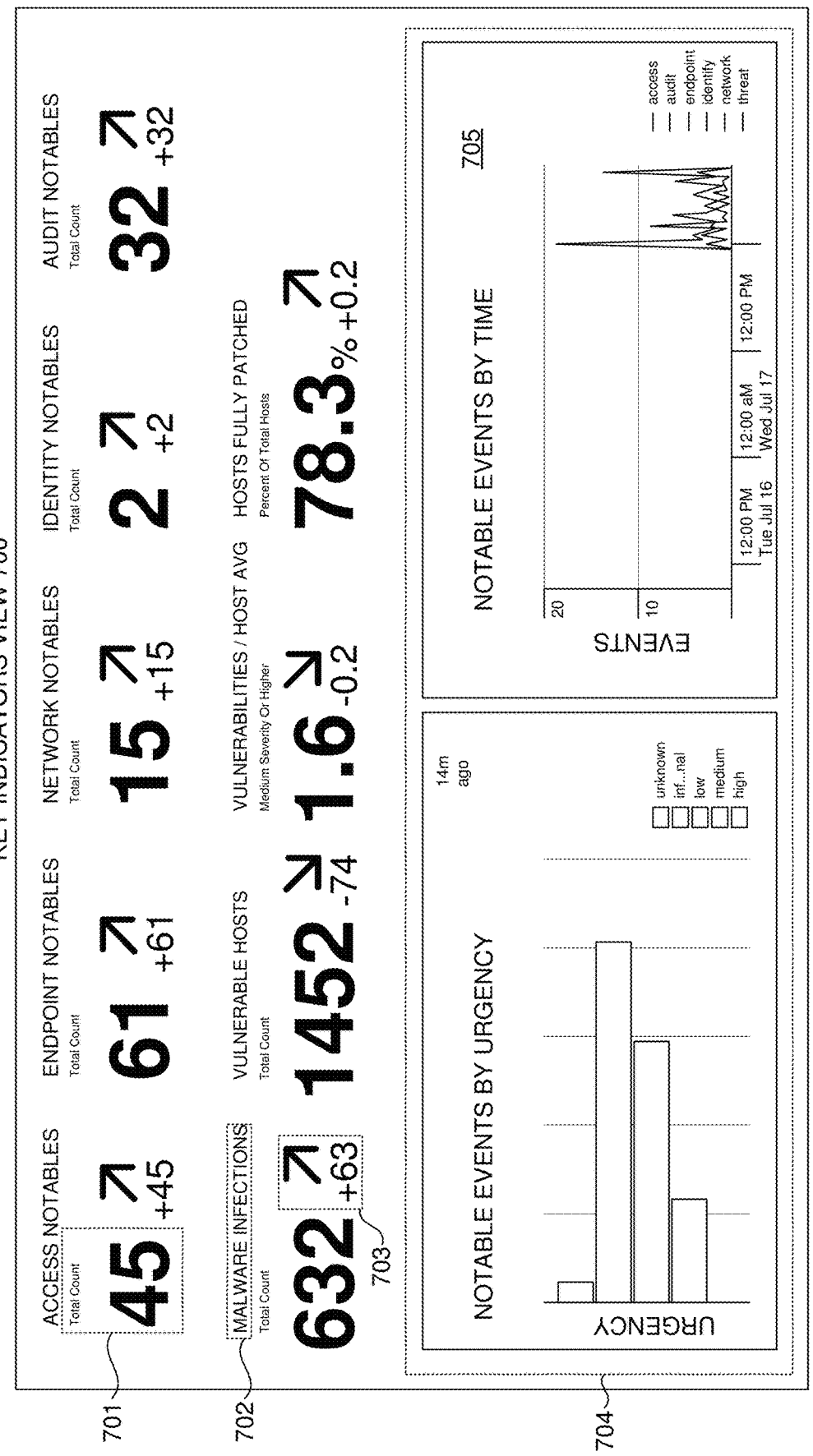
FIG. 7A illustrates a key indicators view in accordance with the disclosed implementations.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by sixty-three (63) during the preceding interval. The key indicators view 700 additionally displays a histogram panel 704 that displays a histogram of notable events organized by urgency values, and a histogram panel 705 of notable events organized by time intervals. This key indicators view is described in further detail in pending U.S. patent application Ser. No. 13/956,338 filed Jul. 31, 2013.

Figure 7B:
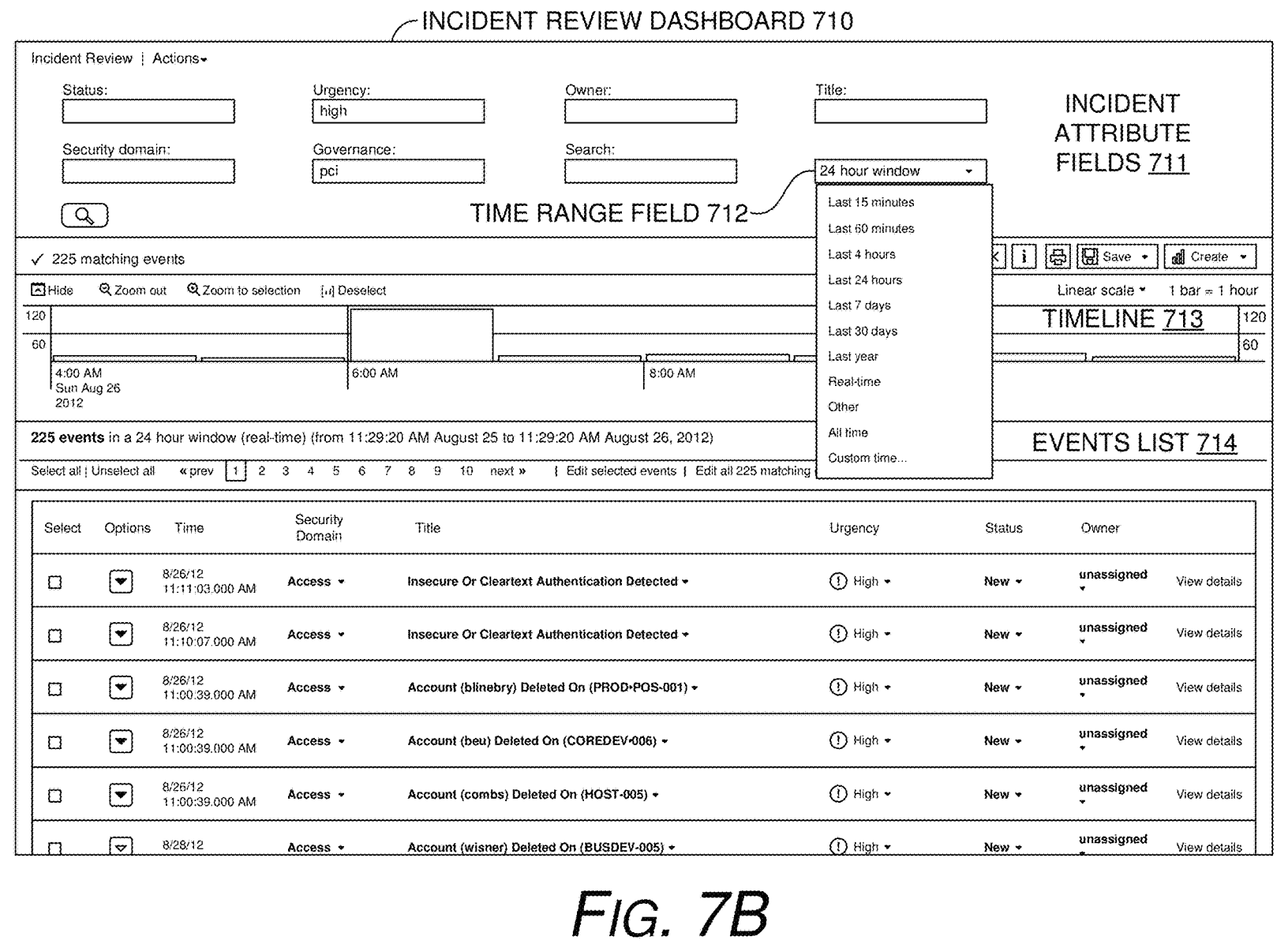

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an example of an incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of each of the notable events that match the criteria in the incident attributes fields 711. To facilitate identifying patterns among the notable events, each notable event can be associated with an urgency value (e.g., low, medium, high, or critical), which is indicated in the incident review dashboard. The urgency value for a detected event can be determined based on the severity of the event and the priority of the system component associated with the event.

Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPUTNIK® APP FOR. VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (I) CPU-related performance metrics; (2) disk-related performance metrics; (3) memory-related performance metrics; (4) network-related performance metrics; (5) energy-usage statistics: (6) data-traffic-related performance metrics; (7) overall system availability performance metrics; (8) cluster-related performance metrics; and (9) virtual machine performance statistics. For more details about such performance metrics, please see U.S. patent Ser. No. 14/167, 316 filed 29 Jan. 2014, which is hereby incorporated herein by reference.

Figure 7C:
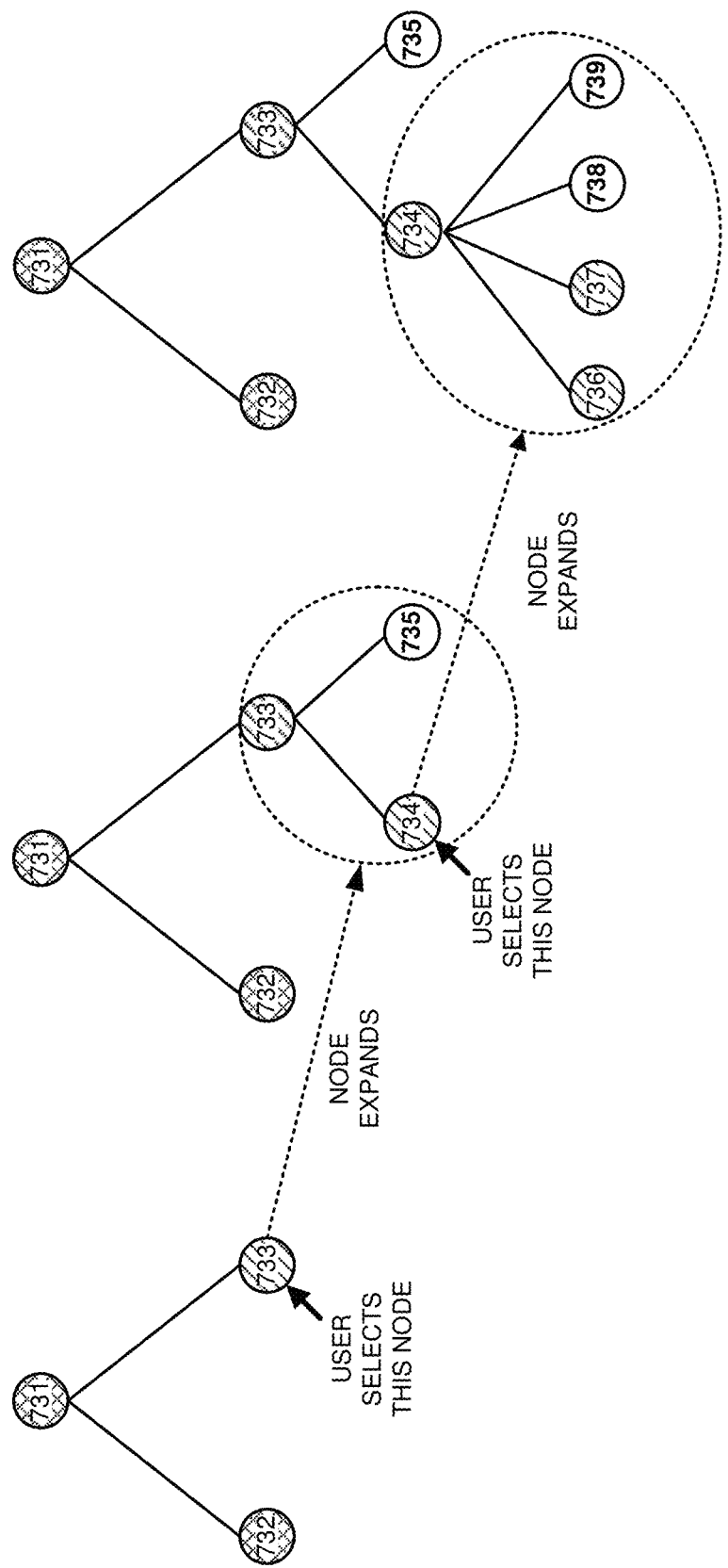
FIG. 7C illustrates a proactive monitoring tree in accordance with the disclosed implementations.

To facilitate retrieving information of interest from performance data and log files, the SPLUNK® APP FOR VMWARE® provides pre-specified schemas for extracting relevant values from different types of performance-related event data, and also enables a user to define such schemas. The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, where nodes 733 and 734 are selectively expanded. Note that the nodes 731-739 can be displayed using different patterns or colors to represent different performance states, such as a critical state, a warning state, a normal state, or an unknown/off-line state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
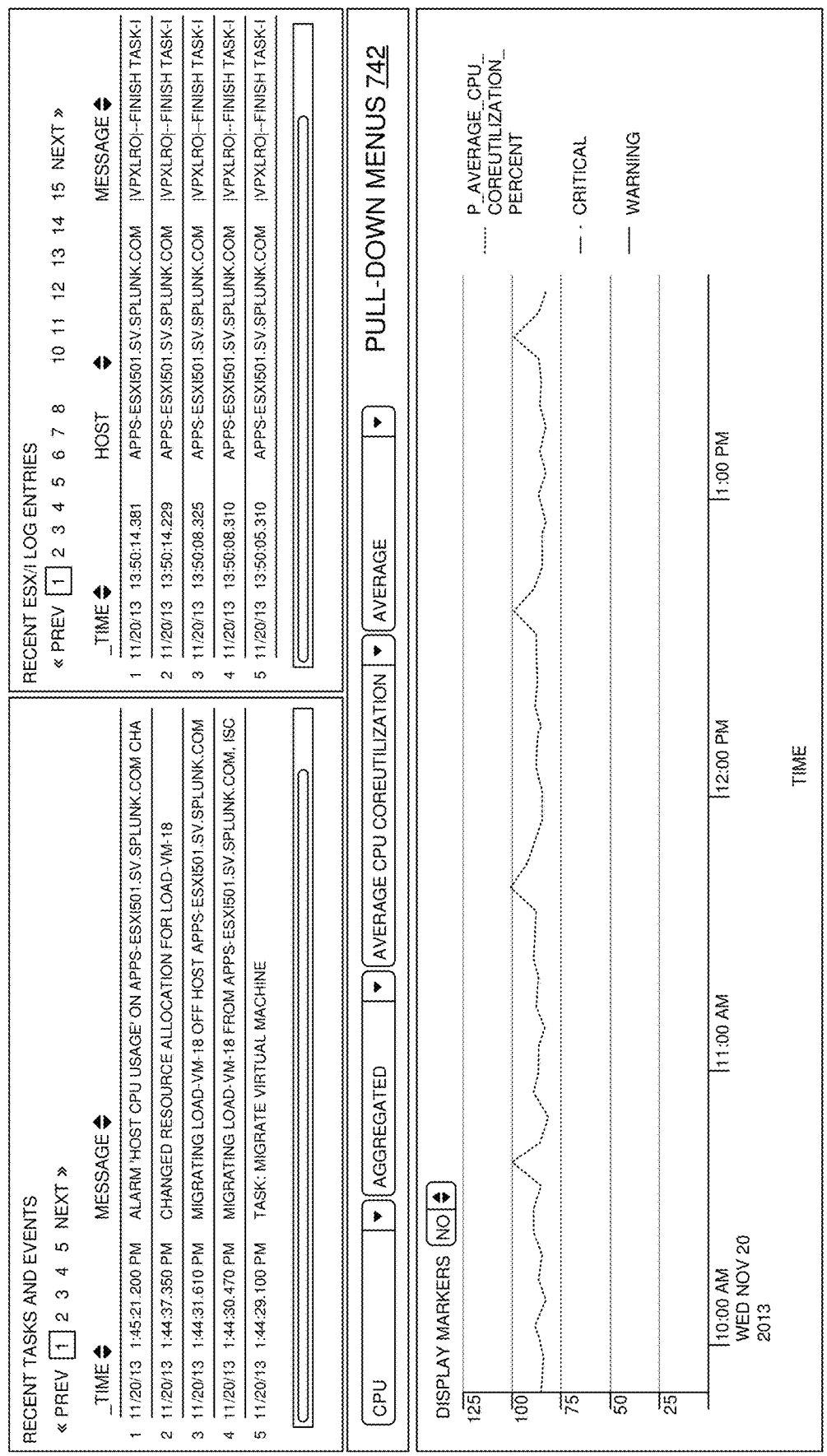
FIG. 7D illustrates a screen displaying both log data and performance data in accordance with the disclosed implementations.

The SPLUNK® APP FOR VMWARE® also provides a user interface that enables a user to select a specific time range and then view heterogeneous data, comprising events, log data, and associated performance metrics, for the selected time range. For example, the interface screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Statistics Value Chart Interface Cell Mode Drill Down

Figure 8A:
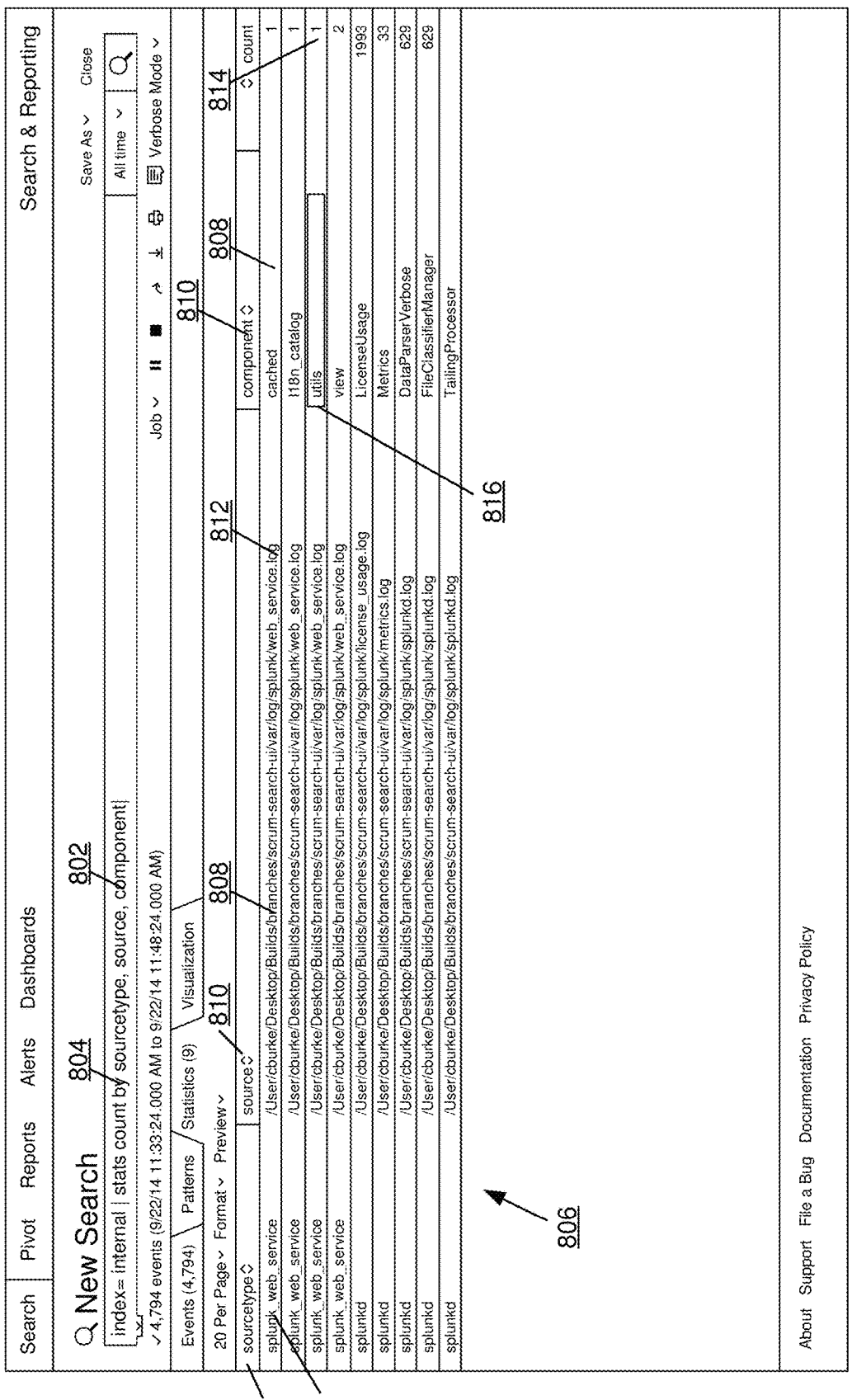

FIG. 8A illustrates an example of a statistics value chart interface 800 displayed as a graphical user interface in accordance with the disclosed embodiments for statistics value chart interface cell mode drill down. The statistics value chart interface 800 includes a search bar 802 that displays a search command 804. The statistics value chart interface 800 displays columns 806 of field values 808 for designated event fields 810. The statistics value chart interface 800 also includes rows 812 that each include the field values 808 of the respective event fields 810 in a particular row. For example, the first row 812 in the interface includes the field value "/Users/cburke/ . . . /log/splunk/web_service. log" of the event field "source"; includes the field value "splunk_web_service" of the event field "sourcetype"; and includes the field value "cached" of the event field "component".

The statistics value chart interface 800 also includes aggregated metrics 814 that each identify the number of events having the field values 808 of the event fields 810 that are listed in a respective row 812. For example, the first row 812 of the statistics value chart interface 800 has an aggregated metric of "1", indicating that one event includes the field-value pairs for "source_type=splunk_web_service", "source=/Users/cburke/ . . . /log/splunk/web_service.log", and "component=cached". In implementations, the aggregated metrics 814 may be any type of metric, such as a count, an average, a sum, or any other aggregating metric associated with a search result set of events.

In implementations, a cell 816 in a row 812 of the statistics value chart interface 800 may be emphasized (e.g., highlighted or any other type of visual emphasis) when a pointer that is displayed moves over a particular cell. This feature is also referred to as highlight with rollover (e.g., detected when a pointer moves over a cell). For example, a user may move a computer mouse, stylus, or other input device pointer over the cell 816, which is then displayed as an emphasized cell. The emphasized cell can then be selected in response to a user input, such as with a mouse click or touch input to select a particular cell, such as shown and described with reference to FIG. 8B.

In FIG. 8A, the statistics value chart interface 800 can be displayed in a table format that includes one or more columns, each column comprising field values of an event field, and each column having a column heading comprising a different one of the event fields. The statistics value chart interface 800 also includes one or more rows, each row comprising one or more of the field values, each field value in a row associated with a different one of the event fields, and each row comprising an aggregated metric that represents a number of events having field-value pairs that match all of the one or more field values listed in a respective row and the corresponding event fields listed in the respective columns. A cell in the table format can be emphasized, the cell including one of the field values in a row that corresponds to one of the different event fields in a column, and in response, a menu is displayed with options that are selectable to transition to a second interface based on a selected one of the options. In embodiments, an events interface displays either a list of events that include the field-value pairs that match the field value of the emphasized cell, or other events that do not include the field-value pairs that match the field value of the emphasized cell. In other embodiments, the statistics value chart interface is displayed excluding the field value in the emphasized cell and the corresponding column.

Figure 8B:
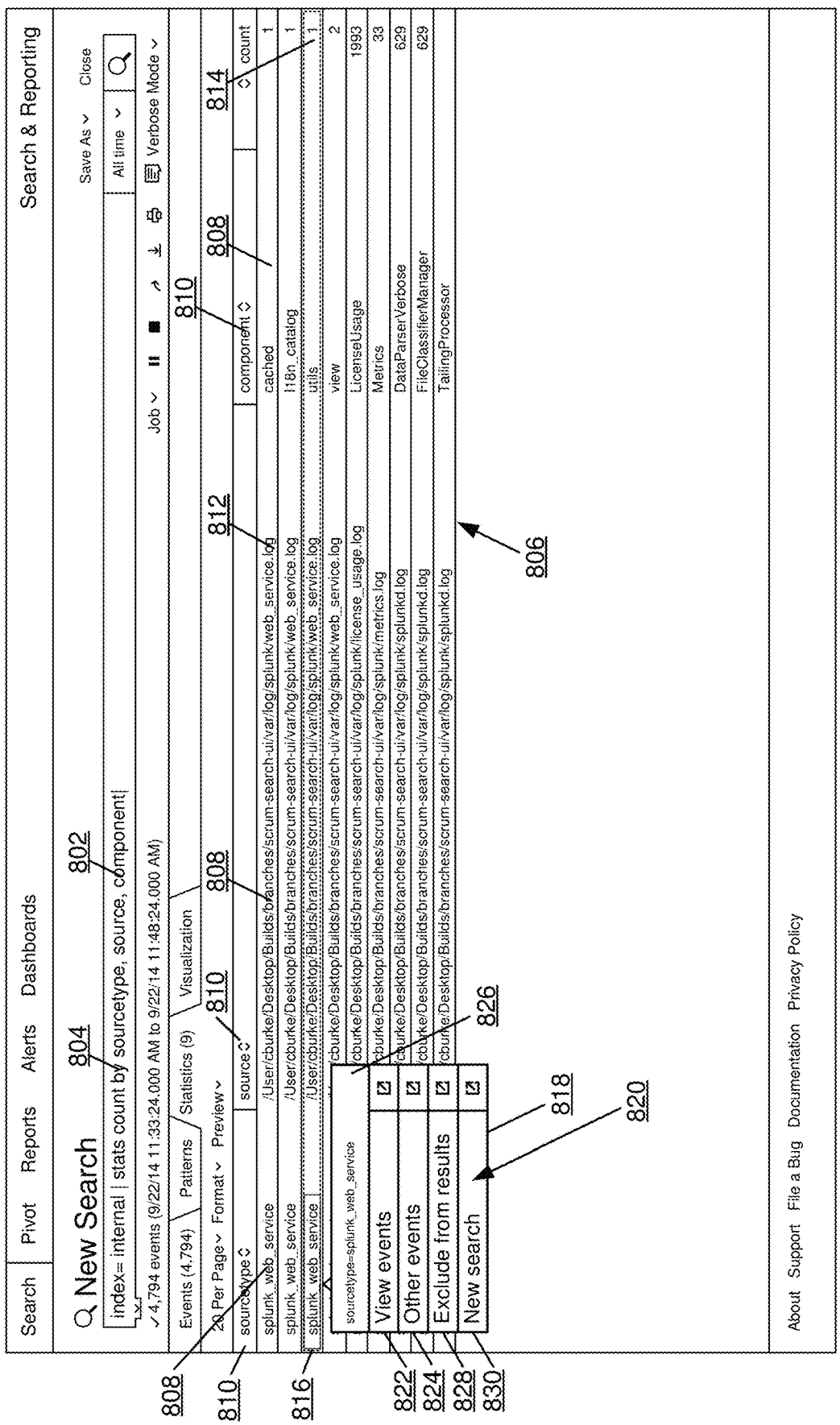

FIG. 8B further illustrates the example of the statistics value chart interface 800 described with reference to FIG. 8A in accordance with the disclosed embodiments for statistics value chart interface cell mode drill down. In this example display of the statistics value chart interface 800, the cell 816 is emphasized and a user has selected the emphasized cell, such as with a mouse click or touch input, which initiates a display of a stats event menu 818 that is displayed responsive to the user input. In implementations, the stats event menu 818 is displayed proximate the emphasized cell 816 in the statistics value chart interface 800, such as a pop-up or drop-down menu just below the emphasized cell.

The stats event menu 818 includes event options 820 that are selectable to transition to an events interface that is shown and further described with reference to FIG. 8C. A user can select an event option 820 from the stats event menu 818 to drill down into events that match the token in an emphasized cell, where the "token" is a field value. The events interface can display a list of the events that include the field value 808 (e.g., "splunk_web_service" in this example) that corresponds to the column with the emphasized cell 816. Alternatively, the events interface can display other events that do not include the field value 808 listed in the emphasized cell.

For example, the event options 820 displayed in the stats event menu 818 include an option "View events" 822 that a user can select to transition to the events interface (FIG. 8C) that displays a list of the events that include the field value 808 that corresponds to the column with the emphasized cell 816. The event options 820 displayed in the stats event menu 818 also include an option "Other events" 824 that a user can select to transition to the events interface that displays a list of other events that do not include the field value 808 that corresponds to the column with the emphasized cell 816. The stats event menu 818 also includes a designation 826 of a field-value pair that is associated with the emphasized cell in the statistics value chart interface 800. The field-value pair displayed as the designation 826 indicates the search drill down relevance of the field-value pair, which is "sourcetype=splunk_web_service" in this example.

The stats event menu 818 also includes the search options 820 that are selectable to operate on the field value 808 (e.g., "splunk_web_service" in this example) that corresponds to the column with the emphasized cell 816. For example, the search options 820 displayed in the stats event menu 818 include an option "Exclude from results" 828 that a user can select to drill down and exclude the field-value pair, which initiates displaying the statistics value chart interface 800 excluding the field value in the emphasized cell 816. The search options 820 displayed in the stats event menu 818 also include an option "New search" 830 that the user can select to create a new search based on the field value in the emphasized cell 816 (e.g., replacing the search command 804 in the search bar 802 with the field value in the emphasized cell). A user selection of the new search option 830 from the stats event menu 818 can be received, and the search command 804 in the search bar 802 is updated based on the search option that is selected for the field value.

Figure 8C:
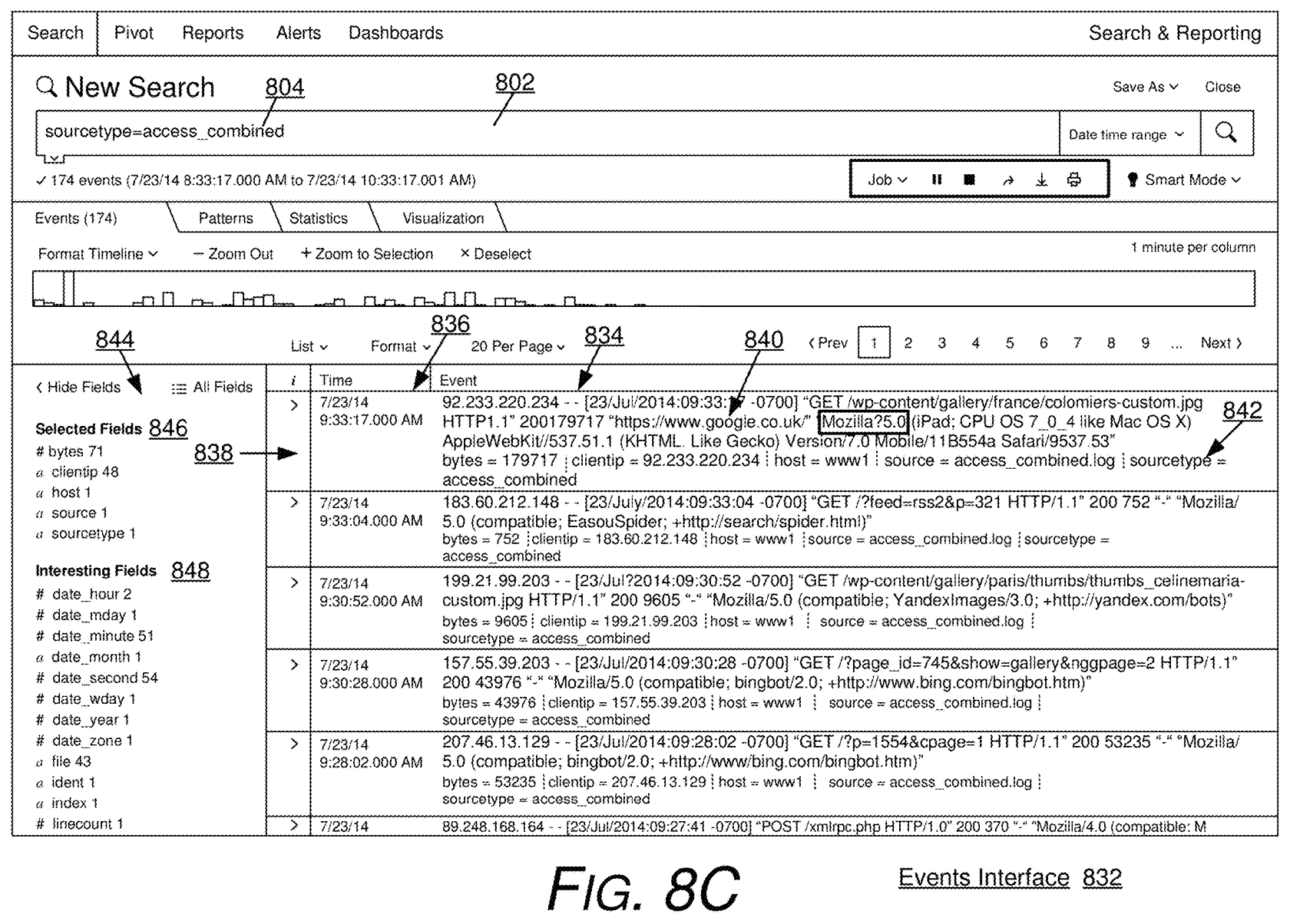

FIG. 8C illustrates an example of an events interface 832 displayed as a graphical user interface in accordance with the disclosed implementations. The events interface 832 includes the search bar 802 that displays a search command 804, which is "sourcetype=access_combined" in this example. The events interface 832 also displays events 834 that are each correlated by a date and time 836. As described previously, the events 834 are a result set of performing the search command 804 that is currently displayed in the search bar 802, and only a subset of the events are shown in the events interface. A user can scroll through the list of events 834 in the events interface 832 to view additional events of the search result set that are not displayed.

An event 838 (e.g., the first displayed event in the list of events 834) generally includes displayed event information, depending on a selected event view from which a user can select a format to display some or all of the event information for each of the events 834 in the events interface. In the example events interface 832, the events 834 are displayed in a list view, in which case the displayed event information for event 838 includes event raw data 840 displayed in an upper portion of the event display area, and includes field-value pairs 842 displayed in a lower portion of the event display area. In this example, each of the events 834 include the current search command 804 (e.g., "sourcetype= access_combined") as a field-value pair 842. The events interface 832 also includes a fields sidebar 844, which displays the selected fields 846 that are also displayed as the fields 842 for each of the events 834, and the fields sidebar 844 includes other interesting fields 848.

Figure 8D:
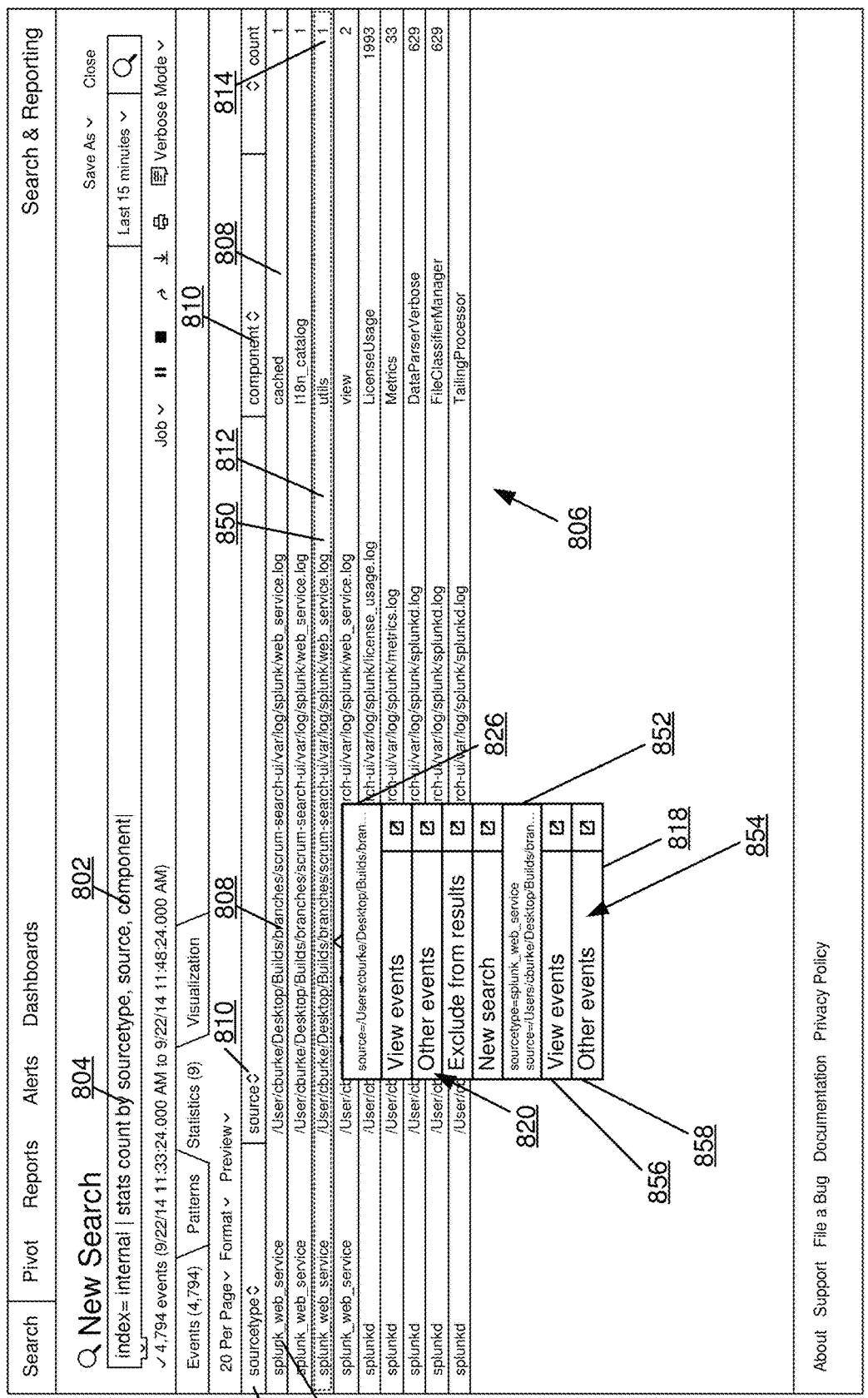

FIG. 8D further illustrates the example of the statistics value chart interface 800 described with reference to FIGS. 8A and 8B in accordance with the disclosed embodiments for statistics value chart interface cell mode drill down. In this example display of the statistics value chart interface 800, a cell 850 is emphasized and a user has selected the emphasized cell, such as with a mouse click or touch input, which initiates a display of the stats event menu 818 as described with reference to FIG. 8B. In this example, the stats event menu 818 reflects a split-by search approach, and the designation 826, as well as an additional designation 852, are updated to display the search field-value pairs added to the stats event menu 818 as cells of the statistics value chart interface 800 are selected progressively moving to the right across the interface. The progressive nature of the example is further illustrated with reference to FIG. 8E.

The designation 826 updates to display the field-value pair with the field value of the currently emphasized cell 850. In this example, the designation 826 corresponds to the event options 320 shown in the stats event menu 818 as described with reference to FIG. 8B, and the field-value pair displayed as the designation 826 is "source=/Users/cburke/ . . . /log/splunk/web_service.log" from the emphasized cell 850. In this example, the additional designation 852 is updated to display the field value of the currently emphasized cell 850, as well as all of the field-value pairs to the left in the cells across the statistics value chart interface 800 in the row 812 that corresponds to the emphasized cell 850. In this example, the designation 852 corresponds to additional event options 854 that are user selectable and include an option "View events" 856 and an option "Other events" 858. The field-value pairs displayed in the designation 852 are "source=/Users/cburke/log/splunk/web_service.log" from the emphasized cell 850, as well as "sourcetype=splunk_web_service" from the cell to the left in the row 812 that corresponds to the emphasized cell 850 in the statistics value chart interface 800. Alternatively, the additional designation 852 may include the field value of the currently emphasized cell 850, as well as any one or combination of the field-value pairs in the cells across the statistics value chart interface 800 in the row 812 that corresponds to the emphasized cell 850.

The stats event menu 818 includes the additional event options 854 that are selectable to transition to the events interface that is shown and further described with reference to FIG. 8C. A user can select an event option 854 from the stats event menu 818 to drill down into events that match the token in an emphasized cell, where the "token" is a field value. The events interface can display a list of the events that include the field values displayed in the corresponding designation 852. Alternatively, the events interface can display other events that do not include the field values listed in the corresponding designation.

For example, the event options 854 displayed in the stats event menu 818 include the option "View events" 856 that a user can select to transition to the events interface (FIG. 8C) that displays a list of the events that include the field values that correspond to the designation 852. The event options 854 displayed in the stats event menu 818 also include the option "Other events" 858 that a user can select to transition to the events interface that displays a listing of other events that do not include the field values in the corresponding designation 852.

Figure 8E:
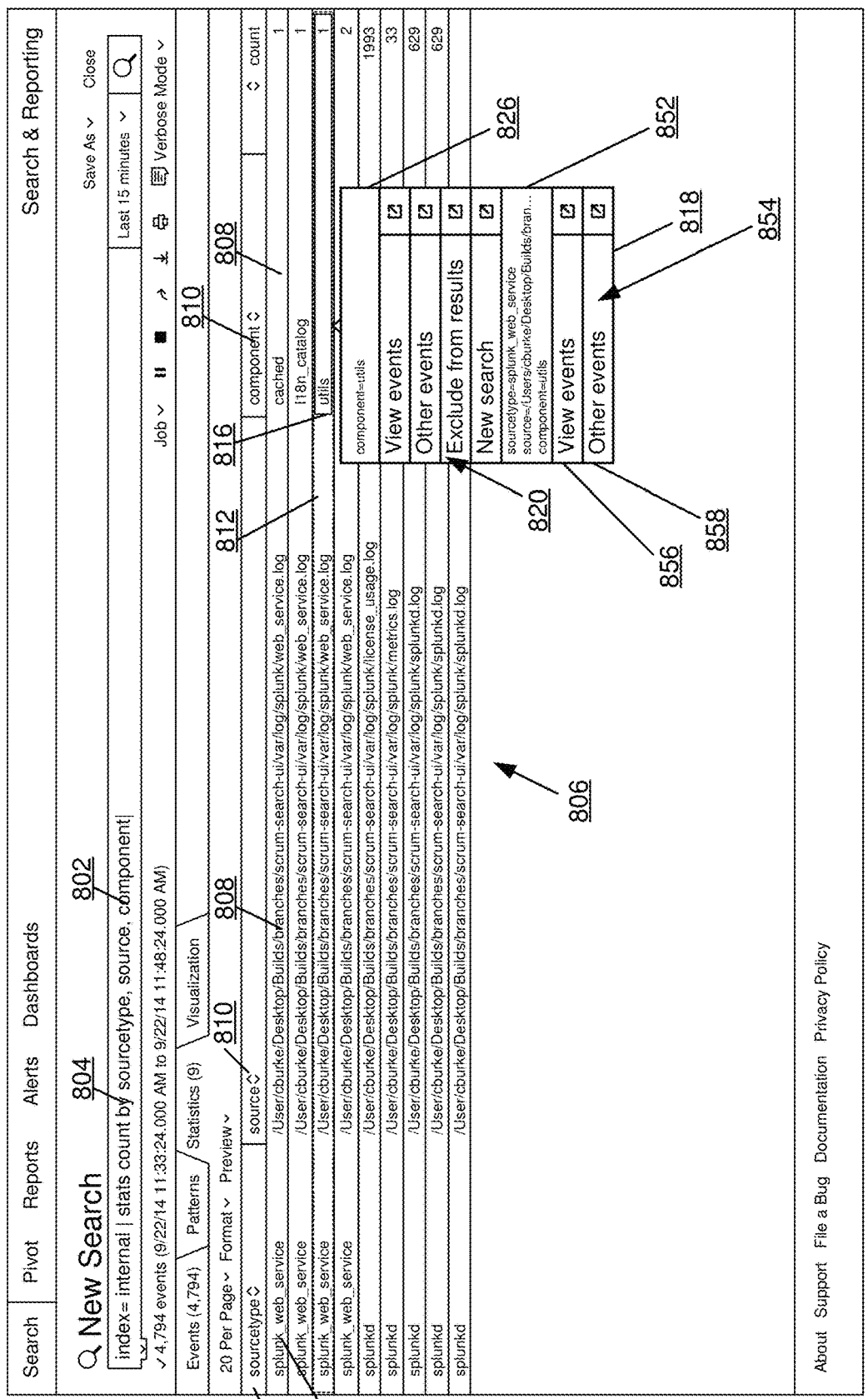

FIG. 8E further illustrates the example of the statistics value chart interface 800 described with reference to FIGS. 8A, 8B, and 8D in accordance with the disclosed embodiments for statistics value chart interface cell mode drill down. In this example display of the statistics value chart interface 800, a cell 860 is emphasized and a user has selected the emphasized cell, such as with a mouse click or touch input, which initiates a display of the stats event menu 818 as described with reference to FIGS. 8B and 8D. In this example, the stats event menu 818 reflects a split-by search approach, and the designation 826, as well as an additional designation 852, are updated to display the search field-value pairs added to the stats event menu 818 as cells of the statistics value chart interface 800 are selected progressively moving to the right across the interface. The progressive nature of the example is illustrated with reference to FIGS. 8B, 8D, and 8E.

The designation 826 updates to display the field-value pair with the field value of the currently emphasized cell 860. In this example, the designation 826 corresponds to the event options 820 shown in the slats event menu 818 as described with reference to FIG. 8B, and the field-value pair displayed as the designation 826 is "component=utils" from the value listed in the emphasized cell 860. The additional designation 852 is updated to display the field value of the currently emphasized cell 860, as well as all of the field-value pairs to the left in the cells across the statistics value chart interface 800 in the row 812 that corresponds to the emphasized cell 860. In this example, the designation 852 displays the field-value pairs "component=utils" from the value listed in the emphasized cell 860, as well as "source=/Users/cburke/ . . . /log/splunk/web_service.log" from the value listed in the cell to the left in the row 812, and "sourcetype=splunk_web_service" from the cell farther to the left in the row 812 in the statistics value chart interface 800.

Statistics Time Chart Interface Cell Mode Drill Down

Figure 9A:
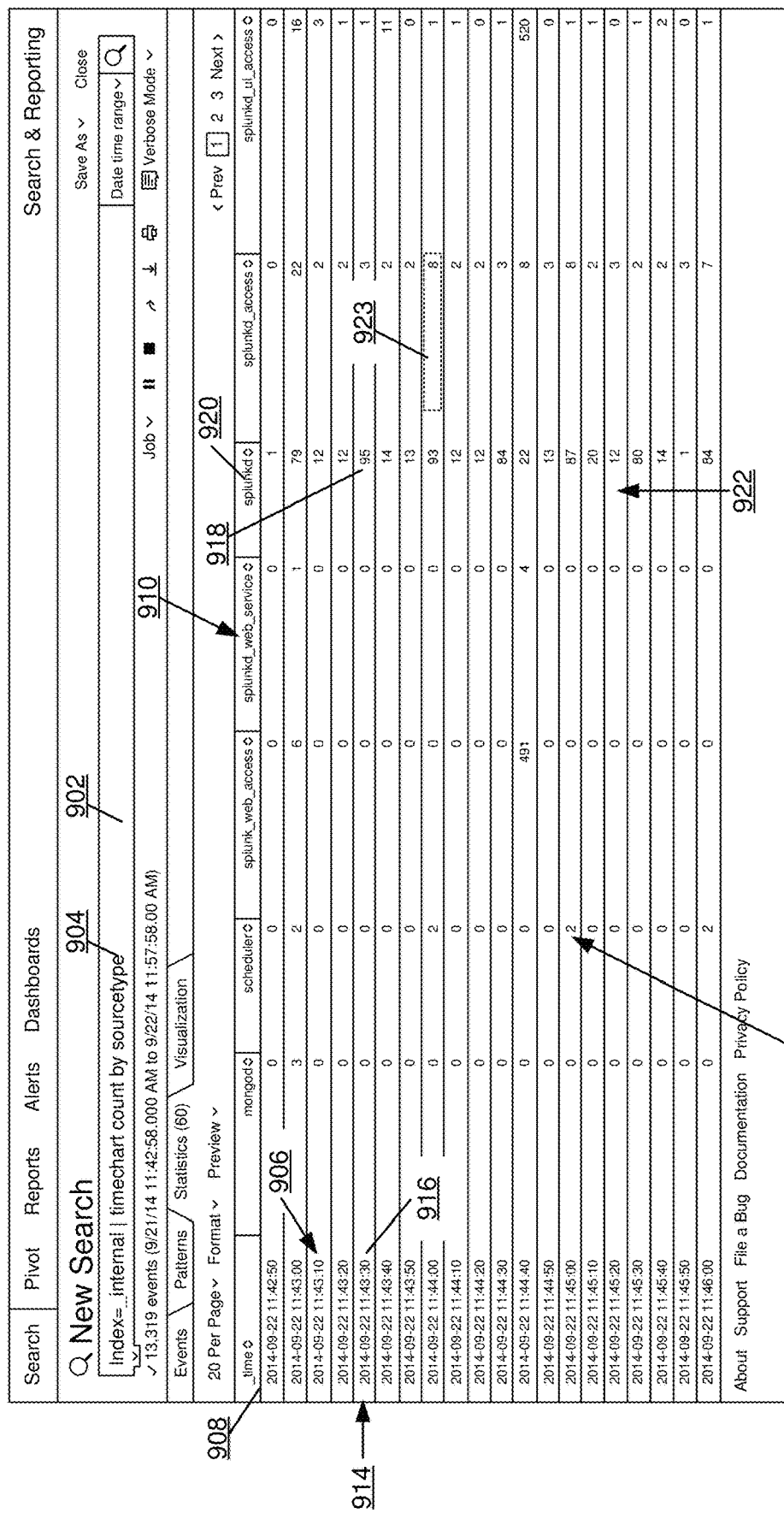
FIG. 9A-9D illustrate examples of statistics search interfaces in cell mode in accordance with the disclosed implementations.

FIG. 9A illustrates an example of a statistics time chart interface 900 displayed as a graphical user interface in accordance with the disclosed embodiments for statistics time chart interface cell mode drill down. The statistics time chart interface 900 includes a search bar 902 that displays a search command 904. The statistics time chart interface 900 displays rows 906, where each row is designated by a time increment 908, and each time increment may include a date associated with the time increment. The statistics time chart interface 900 also includes columns of field values 910 that are associated with an event field, such as the field "sourcetype" in the search command 904 in this example. Each row in the interface 900 includes a time increment 908 and one or more aggregated metrics 912, where each aggregated metric represents a number of events having the respective value 910 that is listed in the corresponding column and within the time increment.

For example, a row 914 in the statistics time chart interface 900 has a date and time increment 916 of "2014-09-22 11:43:20", and includes an aggregated metric "95" shown at 918, indicating that ninety-five events have the value 920 "splunkd" that is listed in the corresponding column 922 and within the time increment 916 in row 914. For a given row and given column, the aggregated number is the count of the field-value pairs that are within the designated time increment (also referred to as a "time bucket"). In implementations, the aggregated metrics 912 may be any type of metric, such as a count, an average, a sum, or any other aggregating metric associated with a search result set of events.

In implementations, a cell 923 in the statistics time chart interface 900 may be emphasized (e.g., highlighted or any other type of visual emphasis) when a pointer that is displayed moves over a particular cell. This feature is also referred to as highlight with rollover (e.g., when a pointer moves over a cell). For example, a user may move a computer mouse, stylus, or other input device pointer over the cell 923, which is then displayed as an emphasized cell. The emphasized cell can then be selected in response to a user input, such as with a mouse click or touch input to select a particular cell, such as shown and described with reference to FIG. 9B.

In FIG. 9A, the statistics time chart interface 900 can be displayed in a table format that includes one or more columns, each column having a column heading comprising a different value, each different value associated with a particular event field. The statistics time chart interface 900 also includes one or more rows, each row comprising a time increment and one or more aggregated metrics, each aggregated metric representing a number of events having a field-value pair that matches the different value represented in one of the columns and within the time increment over which the aggregated metric is calculated. A cell in the table format can be emphasized, the cell including one of the aggregated metrics in a row that includes the respective time increment, and in response, a menu is displayed with options that are selectable to transition to a second interface based on a selected one of the options.

Figure 9B:
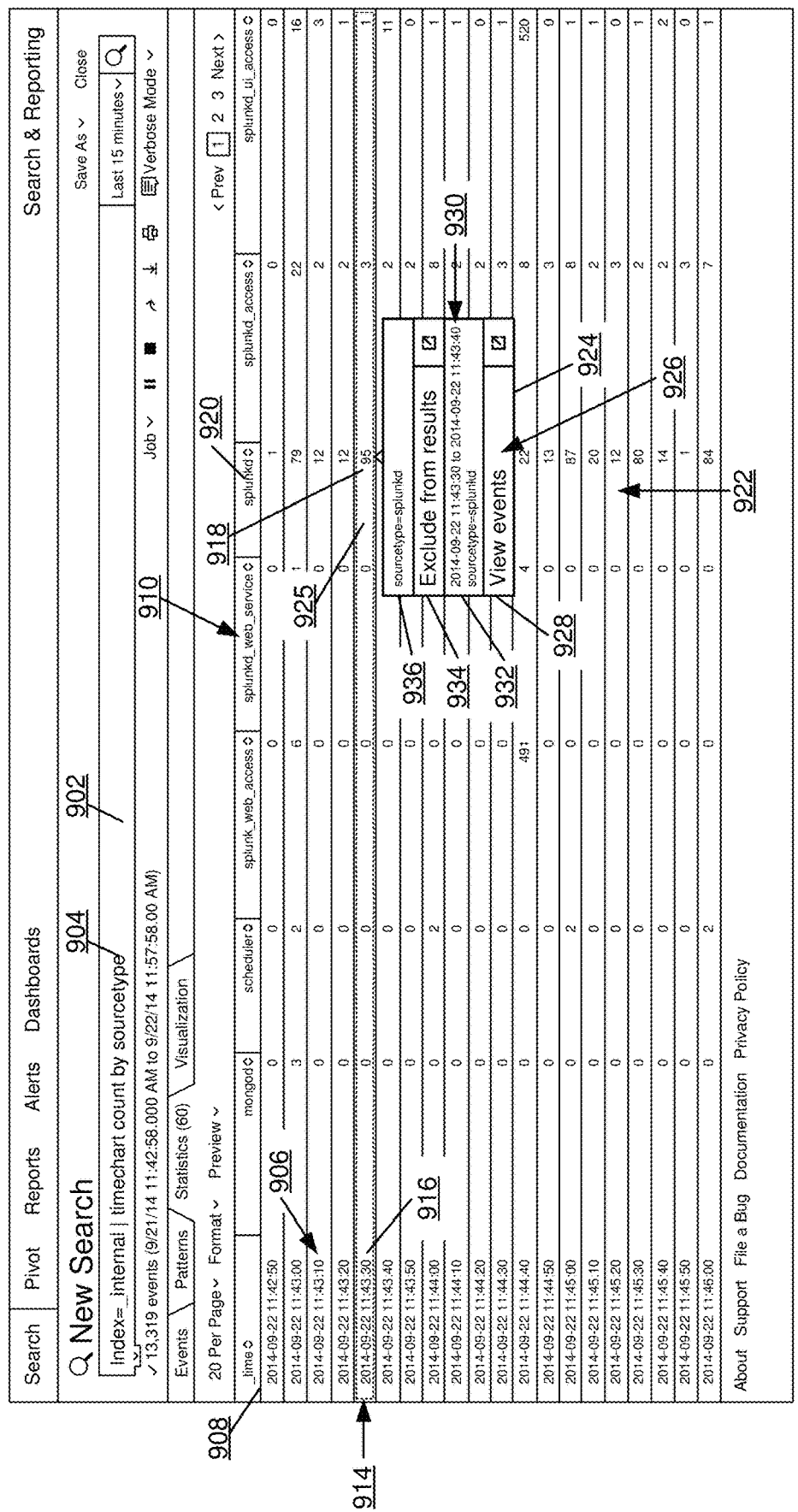

FIG. 9B further illustrates the example of the statistics time chart interface 900 described with reference to FIG. 9A in accordance with the disclosed embodiments for statistics time chart interface cell mode drill down. In this example display of the statistics time chart interface 900, a user has selected an emphasized cell 925 in the row 914, such as with a mouse click or touch input, which initiates display of a stats cell menu 924 that is displayed responsive to the user input. In implementations, the stats cell menu 924 is displayed proximate the emphasized cell 925 in the statistics time chart interface 900, such as a pop-up or drop-down menu just below the emphasized cell.

The stats cell menu 924 includes options 926 that are selectable to transition to an events interface that displays a narrowed list of events that correspond to the time increment 916 of the row 914 with the emphasized cell 925. For example, the options 926 displayed in the stats cell menu 924 include an option "View events" 928 that a user can select to transition to the events interface that displays the narrowed list of the events that include a field-value pair with the respective value 920 that is listed in the corresponding column 922 and within a time duration 930 of the time increment 916 of the row 914 with the emphasized cell 925. The stats cell menu 924 includes a designation 932 that corresponds to the selectable option 928, the designation 932 being associated with the time duration 930 that encompasses the time increment 916 corresponding to the row 914 with the emphasized cell 925. For example, the time duration 930 is designated as "11:43:30 to 11:43:40", which encompasses the time increment 916 and is a windowed 10-seconds of time. The designation 932 also displays the field-value pair with the respective value 920 that is listed in the corresponding column 922 (e.g., "sourcetype=splunkd" in this example).

The stats cell menu 924 also includes options 926 that are selectable to drill down into the table and initiate displaying the statistics time chart interface 900 excluding the particular value 920 that is listed in the corresponding column 922. For example, the options 926 displayed in the stats cell menu 924 include an option "Exclude from results" 934 that a user can select to drill down and exclude the value 920 for the field-value pair corresponding to the column 922. The stats cell menu 924 also includes a designation 936 that corresponds to the selectable option 934, and the designation 936 displays the field-value pair with the respective value 920 that is listed in the corresponding column 922 (e.g., "sourcetype=splunkd" in this example).

Figure 9C:
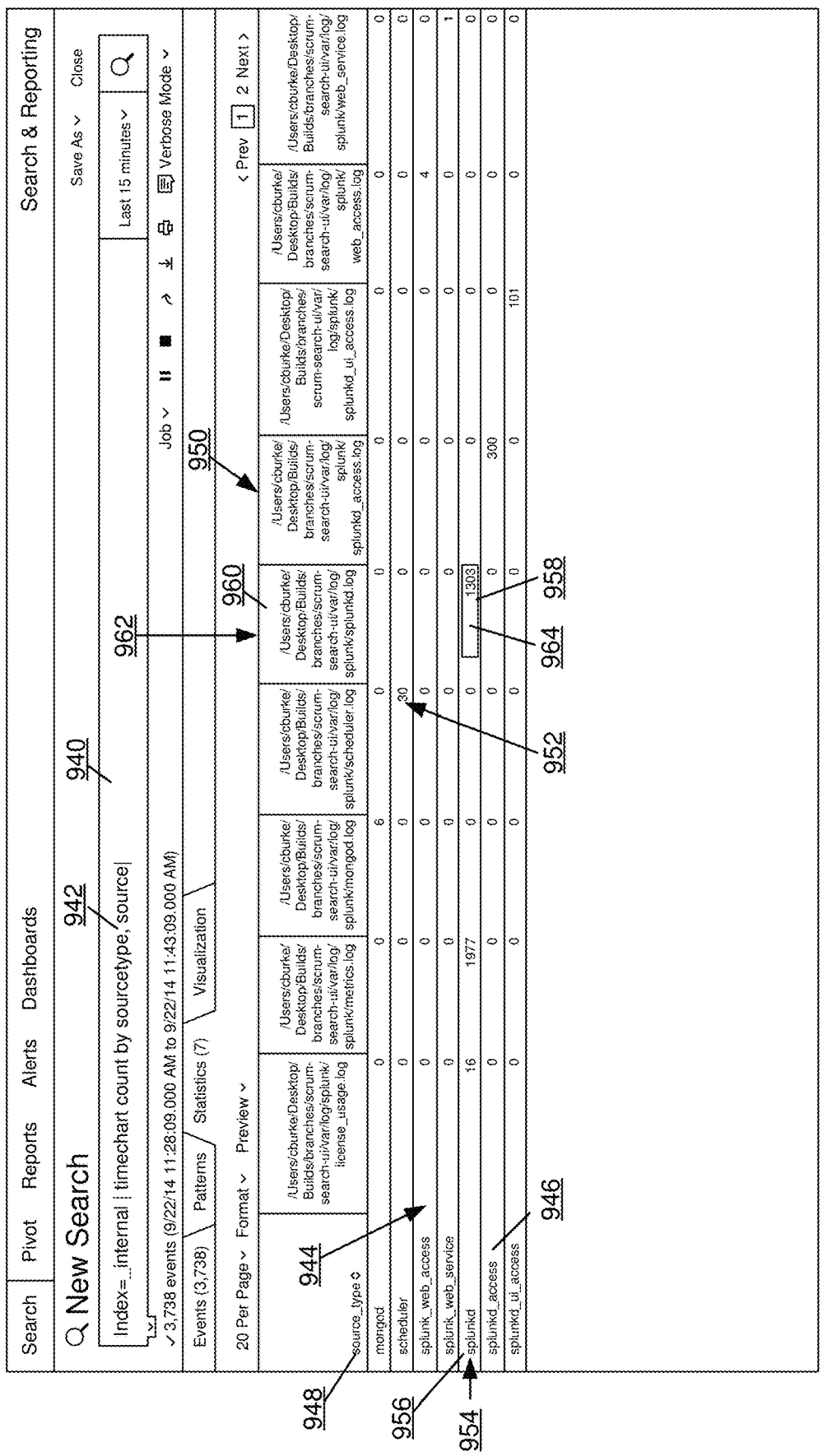

FIG. 9C illustrates an example of a statistics cell chart interface 938 displayed as a graphical user interface in accordance with the disclosed embodiments for statistics chart interface cell mode drill down. The statistics cell chart interface 938 includes a search bar 940 that displays a search command 942. The statistics cell chart interface 938 displays rows 944, where each row is designated by a field value 946 of an event field 948, which is the field "sourcetype" in this example. The statistics cell chart interface 938 also includes columns of field values 950 that are associated with one or more event fields, such as the event fields "sourcetype" and "source" as indicated in the search command 942 in this example. Each row in the statistics cell chart interface 938 includes a field value 946 (e.g., of the event field 948) and one or more aggregated metrics 952, where each aggregated metric represents a number of events having the respective value 950 that is listed in the corresponding column for a designated row 944.

For example, a row 954 in the statistics cell chart interface 938 has a field value 956 of "splunkd", and includes an aggregated metric "1303" shown at 958, indicating that 1,303 events have the value 956 "splunkd" and a value 960 of "/Users/cburke/Desktop . . . /splunk/splunkd.log" that is listed in the corresponding column 962 and in row 954. For a given row and given column, the aggregated number is the count of events that include the field-value pairs that are within the designated row and column of the statistics cell chart interface 938. In implementations, the aggregated metrics 912 may be any type of metric, such as a count, an average, a sum, or any other aggregating metric associated with a search result set of events.

In implementations, a cell 964 in the statistics cell chart interface 938 may be emphasized (e.g., highlighted or any other type of visual emphasis) when a pointer that is displayed moves over a particular cell. This feature is also referred to as highlight with rollover (e.g., when a pointer moves over a cell). For example, a user may move a computer mouse, stylus, or other input device pointer over the cell 964, which is then displayed as an emphasized cell. The emphasized cell can then be selected in response to a user input, such as with a mouse click or touch input to select a particular cell, such as shown and described with reference to FIG. 9D.

Figure 9D:
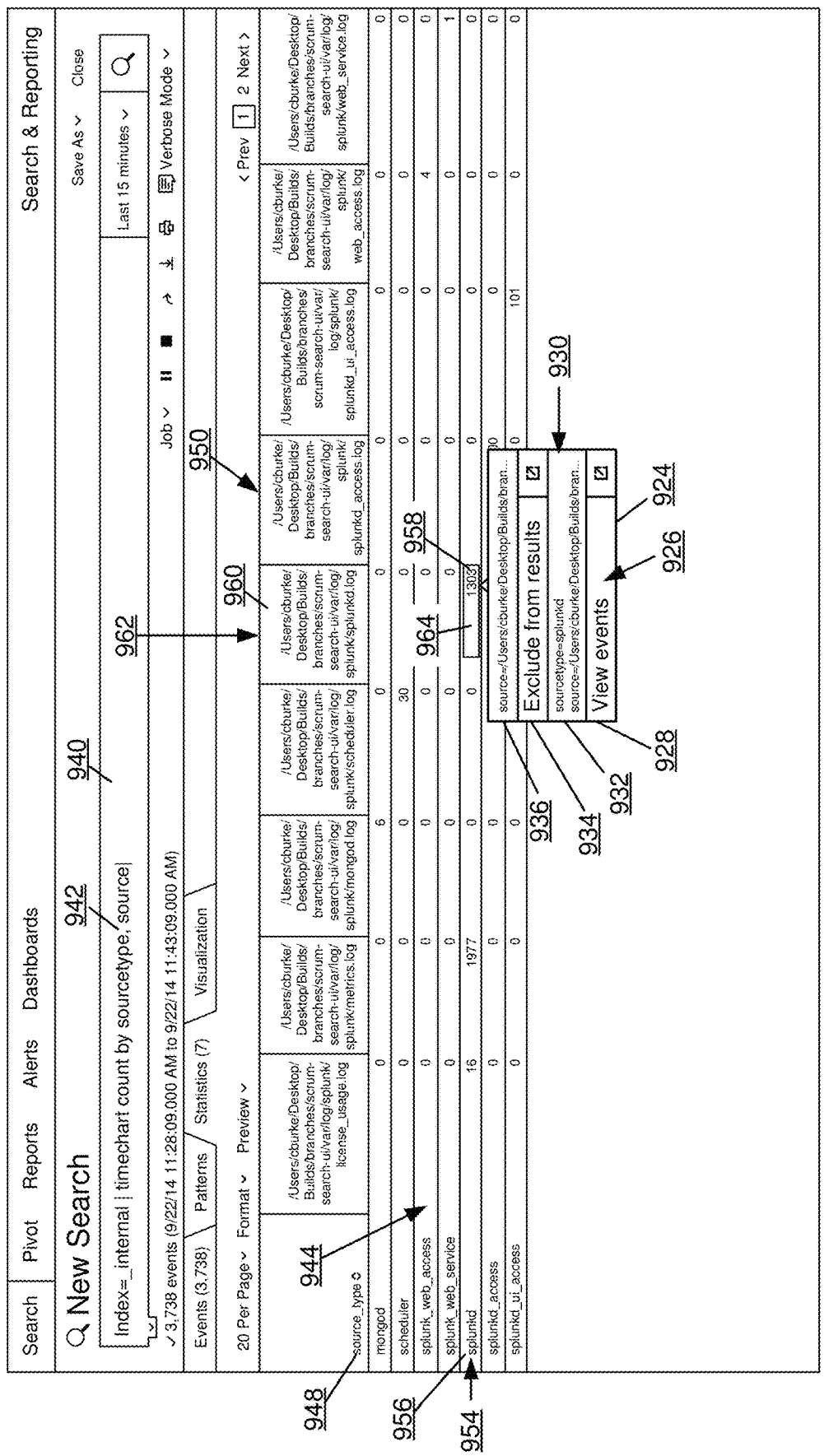

FIG. 9D further illustrates the example of the statistics cell chart interface 938 described with reference to FIG. 9C in accordance with the disclosed embodiments for statistics chart interface cell mode drill down. In this example display of the statistics cell chart interface 938, a user has selected the emphasized cell 964, such as with a mouse click or touch input, which initiates display of a stats cell menu 924 that is displayed responsive to the user input (e.g., similarly displayed in FIG. 9B). In implementations, the stats cell menu 924 is displayed proximate the emphasized cell 964 in the statistics cell chart interface 938, such as a pop-up or drop-down menu just below the emphasized row.

The stats cell menu 924 includes options 926 that are selectable to transition to an events interface that displays a narrowed list of events that correspond to the field value 956 of the row 954 with the emphasized cell 964. For example, the options 926 displayed in the stats cell menu 924 include an option "View events" 928 that a user can select to transition to the events interface that displays the narrowed list of the events that include a field-value pairs with the respective value 960 that is listed in the corresponding column 962 and respective value 956 of the row 954 with the emphasized cell 964. The stats cell menu 924 includes a designation 932 that corresponds to the selectable option 928, the designation 932 indicating the respective field values 956 and 960 for the field-value pairs.

The stats cell menu 924 also includes options 926 that are selectable to drill down into the table and initiate displaying the statistics cell chart interface 938 excluding the particular value 960 that is listed in the corresponding column 962. For example, the options 926 displayed in the stats cell menu 924 include an option "Exclude from results" 934 that a user can select to drill down and exclude the value 960 for the field-value pair corresponding to the column 962. The stats cell menu 924 also includes a designation 936 that corresponds to the selectable option 934, and the designation 936 displays the field-value pair with the respective value 960 that is listed in the corresponding column 962. In cell mode, the statistics cell chart interface 938 is a split-by chart formulated based on the selected event fields (e.g., "source" and "sourcetype" in this example).

Example Methods

Example methods 1000 and 1100 are described with reference to respective FIGS. 10 and 11 in accordance with one or more embodiments of statistics value chart interface cell mode drill down. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Computing devices (to include server devices) can be implemented with various components, such as a processing system and memory, and with any number and combination of different components as further described with reference to the example device shown in FIG. 12. One or more computing devices can implement the search system, in hardware and at least partially in software, such as executable software instructions (e.g., computer-executable instructions) that are executable with a processing system (e.g., one or more computer processors) implemented by the one or more computing devices. The search system can be stored on computer-readable, non-volatile storage memory, such as any suitable memory device or electronic data storage implemented by the computing devices.

Figure 10:
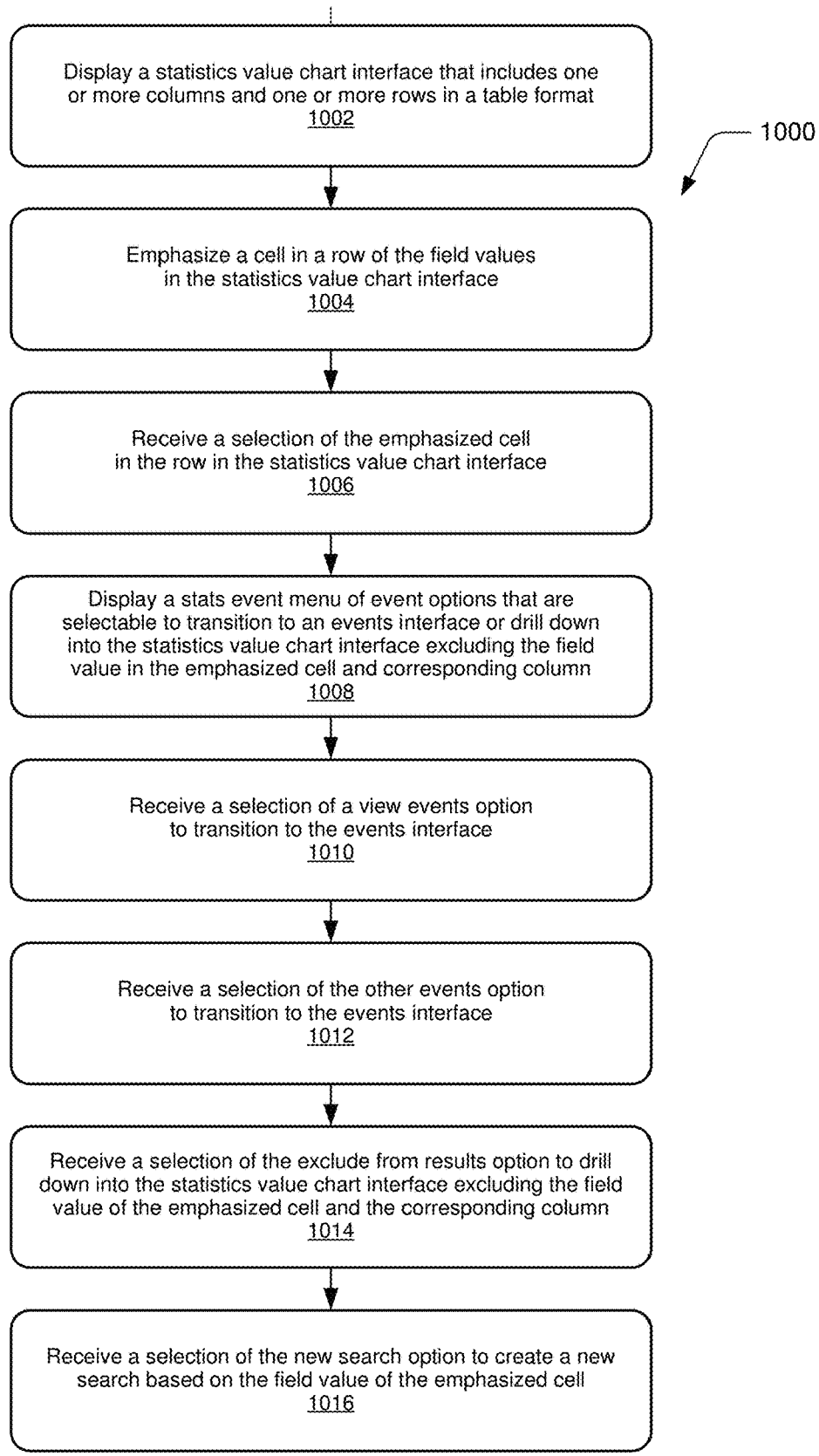
FIG. 10 illustrates example method(s) of statistics value chart interface cell mode drill down in accordance with one or more embodiments.

FIG. 10 illustrates example method(s) 1000 of statistics value chart interface cell mode drill down, and is generally described with reference to a statistics value chart interface. The method(s) 1000 may be implemented by a computing device, a distributed system of computing devices, and/or by one or more user client devices. The order in which a method is described is not intended to be construed as a limitation, and any number or combination of the method operations and/or methods can be performed in any order to implement a method, or an alternate method.

At 1002, a statistics value chart interface is displayed that includes columns of field values associated with respective event fields, where each column includes a header as one of the event fields, and the statistics value chart interface includes rows that each include the field values of the respective event fields. For example, the statistics value chart interface 800 (FIG. 8A) includes columns 806 of field values 808 for designated event fields 810, where each column 806 includes a header as one of the event fields 810. The statistics value chart interface 800 also includes rows 812 that each include the field values 808 of the respective event fields 810 in a particular row. Each of the rows 812 in the statistics value chart interface 800 further include an aggregated metric 814 that identifies a number of events having field-value pairs corresponding to the one or more field values 808 listed in a respective row 812.

At 1004, a cell in a row of the field values in the statistics value chart interface is emphasized. For example, a cell 816 in a row 812 of the field values 808 in the statistics value chart interface 800 is emphasized responsive to detection of an input pointer over the emphasized cell. A user may move a computer mouse, stylus, or other input device pointer over the cell 816, which is then displayed as an emphasized cell.

At 1006, a selection is received of the emphasized cell in the row in the statistics value chart interface and in response, at 1008, a stats event menu is displayed with event options that are selectable to transition to an events interface or drill down into the statistics value chart interface excluding the field value in the emphasized cell and corresponding column. For example, a user selects the emphasized cell 816, such as with a mouse click or touch input, which initiates a display of the stats event menu 818 (FIG. 8B) that is displayed responsive to the user input and proximate the emphasized cell 816. The stats event menu 818 includes the event options 820 displayed in the stats event menu as a view events option 822, an other events option 824, an exclude from results option 828, and a new search option 830.

Further, the stats event menu 818 includes a designation 826 (FIG. 8B) of a field-value pair that includes the field value 808 of the emphasized cell 816. Alternatively, the stats event menu 818 includes a designation 852 (FIGS. 8D and 8E) of a field-value pair that includes the field value of the emphasized cell 850, and the field values 808 listed in the row 812 to the left of the emphasized cell. Alternatively or in addition, the stats event menu 818 includes a designation of a field-value pair that includes the field value of the emphasized cell, and one or more of the field values listed in the row of the emphasized cell.

At 1010, a selection of the view events option is received to transition to the events interface. For example, a user can select the option "View events" 822 to transition to the events interface (FIG. 8C) that displays a list of the events that include the field value 808 that corresponds to the column with the emphasized cell 816. At 1012, a selection of the other events option is received to transition to the events interface. For example, a user can select the option "Other events" 824 that a user can select to transition to the events interface that displays a list of other events that do not include the field value 808 that corresponds to the column with the emphasized cell 816. The events interface can display either a list of events that include the field value of the emphasized cell, or other events that do not include the field value of the emphasized cell. Alternatively, the events interface displays a list of events that include one or more of the field values listed in the row with the emphasized cell, or other events that do not include one or more of the field values listed in the row with the emphasized cell. Alternatively or in addition, the events interface displays a list of events that include the field value of the emphasized cell and the field values listed in the row to the left of the emphasized cell.

At 1014, a selection of the exclude from results option is received to drill down into the statistics value chart interface excluding the field value of the emphasized cell and the corresponding column. For example, a user can select the option "Exclude from results" 828 that a user can select to drill down and exclude the field-value pair, which initiates displaying the statistics value chart interface 800 excluding the field value in the emphasized cell 816. The option to drill down into the statistics value chart interface excludes the field value in the emphasized cell and the corresponding column from the statistics value chart interface.

At 1016, a selection of the new search option is received to create a new search based on the field value of the emphasized cell. For example, a user can select the option "New search" 830 that the user can select to create a new search based on the field value in the emphasized cell 816 (e.g., replacing the search command 804 in the search bar 802 with the field value in the emphasized cell). A user selection of the new search option 830 from the stats event menu 818 can be received, and the search command 804 in the search bar 802 is updated based on the search option that is selected for the field value.

Figure 11:
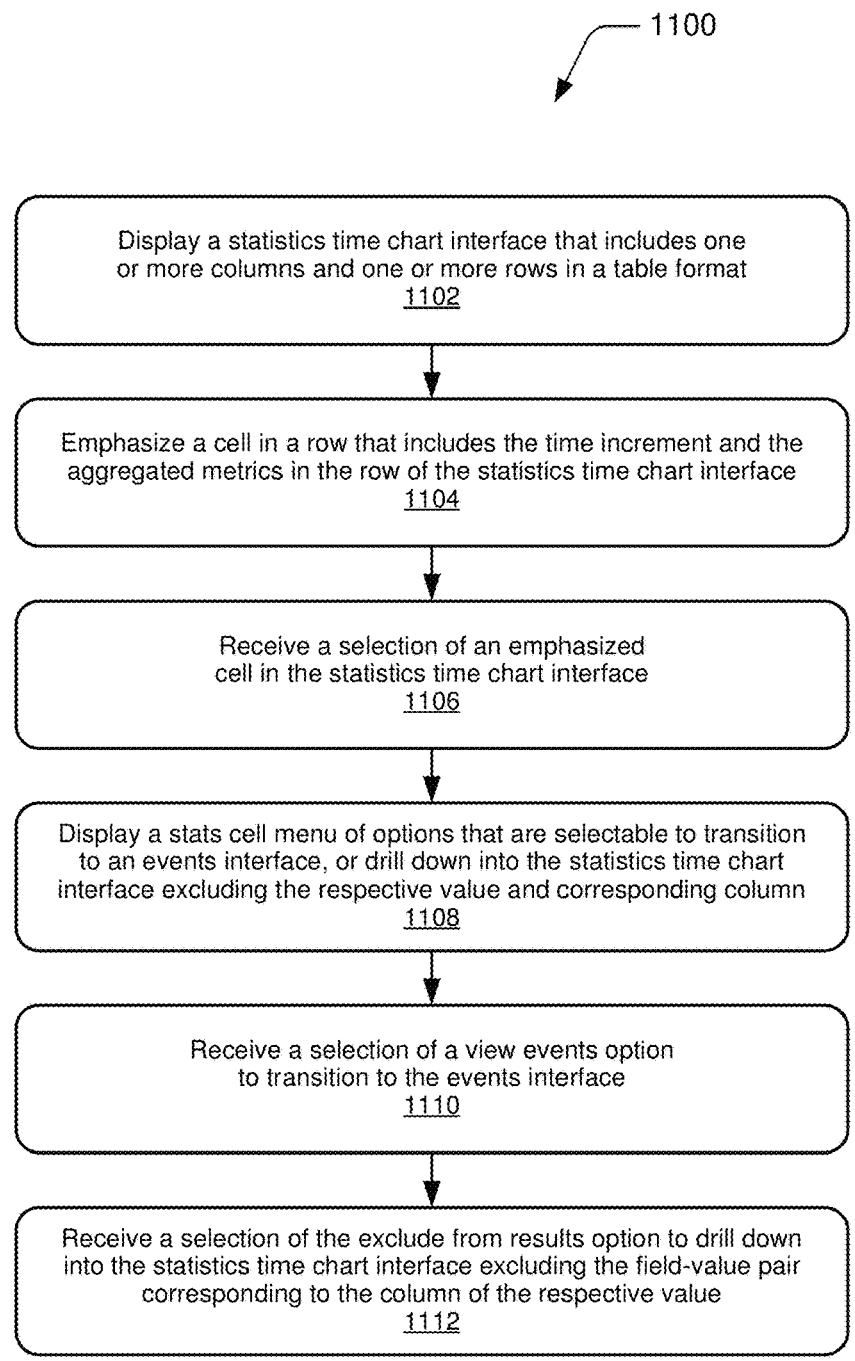
FIG. 11 illustrates example method(s) of statistics time chart interface cell mode drill down in accordance with one or more embodiments.

FIG. 11 illustrates example method(s) 1100 of statistics time chart interface cell mode drill down, and is generally described with reference to a statistics time chart interface. The method(s) 1100 may be implemented by a computing device, a distributed system of computing devices, and/or by one or more user client devices. The order in which a method is described is not intended to be construed as a limitation, and any number or combination of the method operations and/or methods can be performed in any order to implement a method, or an alternate method.

At 1102, a statistics time chart interface is displayed that includes one or more columns of values associated with an event field, and includes one or more rows, each including a time increment and aggregated metrics. For example, the statistics time chart interface 900 (FIG. 9A) is displayed and includes the rows 906 that are each designated by a time increment 908, and each time increment may include a date associated with the time increment. The statistics time chart interface 900 also includes the columns of values 910 that are associated with an event field. Each row in the statistics time chart interface 900 includes a time increment 908 and one or more aggregated metrics 912, where each aggregated metric represents a number of the events having the respective value 910 that is listed in the corresponding column and within the time increment.

At 1104, a cell is emphasized in a row that includes the time increment and the one or more aggregated metrics in the row of the statistics time chart interface. For example, a user may move a computer mouse, stylus, or other input device pointer over any of the one or more aggregated metrics 912 in a row 906, which then displays an emphasized cell (e.g., highlighted or any other type of visual emphasis). The emphasized cell can then be selected in response to a user input, such as with a mouse click or touch input to select a particular row.

At 1106, a selection of an emphasized cell in the statistics time chart interface is received and, at 1108, a stats cell menu is displayed with options that are selectable to transition to an events interface, or drill down into the statistics time chart interface excluding the respective value and corresponding column. For example, the emphasized cell 925 can be selected as a user input, such as with a mouse click or touch input to select the emphasized row. The stats cell menu 924 (FIG. 9B) is then displayed proximate the emphasized cell 925 in the statistics time chart interface 900 based on the selection of the emphasized cell. The options displayed in the stats cell menu 924 include the view events option 928 and the exclude from results option 934. The stats cell menu 924 includes the designation 932 that corresponds to the view events option 928 and includes the time duration 930 that encompasses the time increment 916 corresponding to the row 914 with the emphasized cell 925, where the designation 932 further displays the field-value pair corresponding to the column 922 of the respective value 920. The stats cell menu 924 also includes the designation 936 that corresponds to the exclude from results option 934 and includes a display of the field-value pair corresponding to the column of the respective value.

At 1110, a selection of the view events option is received to transition to the events interface. For example, a user can select the option "View events" 928 to transition to the events interface that displays the narrowed list of the events that include a field-value pair with the respective value 920 that is listed in the corresponding column 922 and within a time duration 930 of the time increment 916 of the row 914 with the emphasized cell 925. At 1112, a selection of the exclude from results option is received to drill down into the statistics time chart interface excluding the field-value pair corresponding to the column of the respective value. For example, a user can select the option "Exclude from results" 934 to drill down and exclude the value 920 for the field-value pair corresponding to the column 922.

Example System and Device

Figure 12:
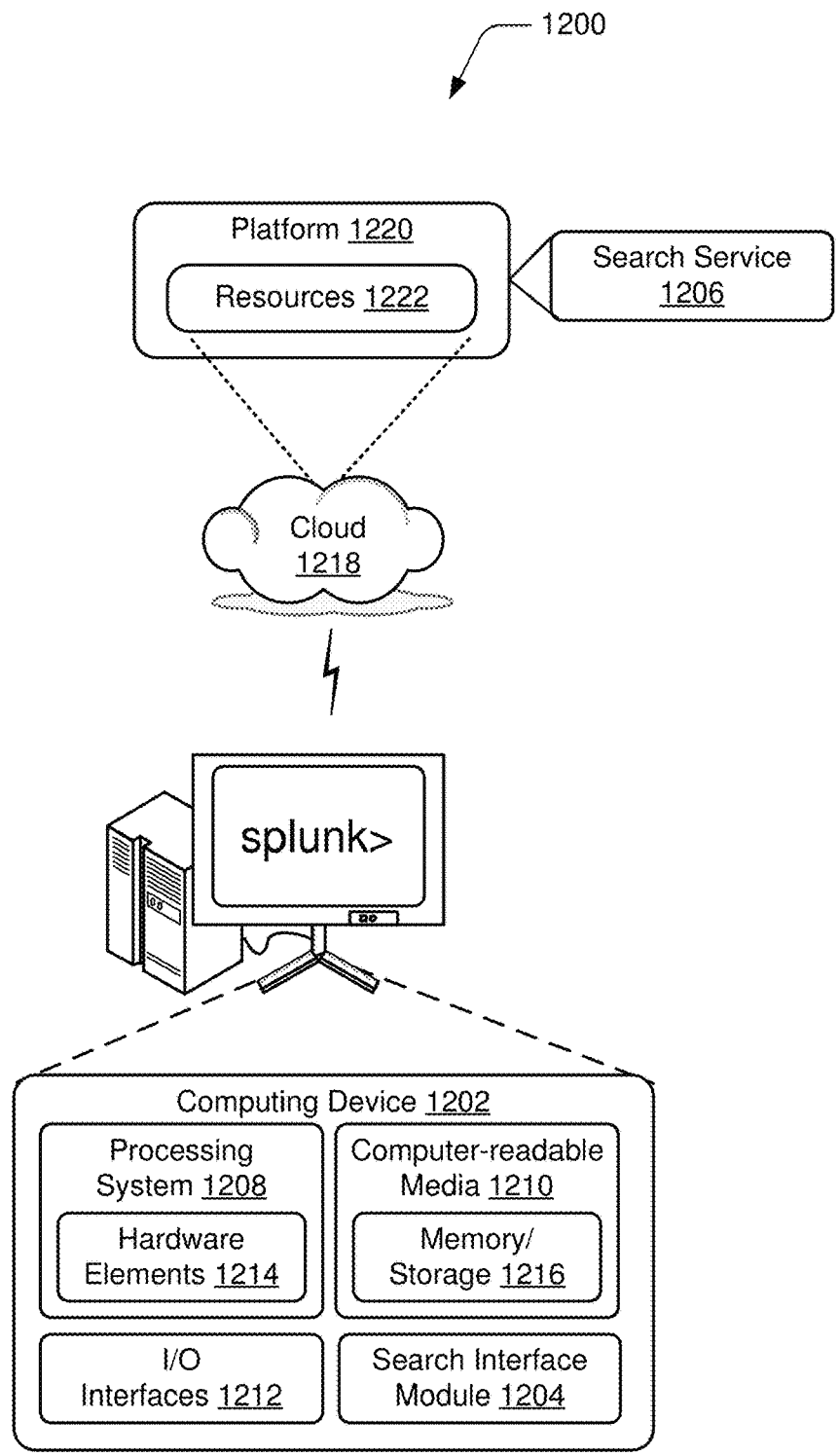
FIG. 12 illustrates an example system with an example device that can implement embodiments of statistics value chart interface cell mode drill down.

FIG. 12 illustrates an example system generally at 1200 that includes an example computing device 1202 that is representative of one or more computing systems and/or devices that may implement the various techniques described herein. This is illustrated through inclusion of the search interface module 1204 that is representative of functionality to interact with a search service 1206, e.g., to specify and manage searches using a late-binding schema and events as described above and thus may correspond to the client application module 106 and system 100 of FIG. 1. The computing device 1202 may be, for example, a server of a service provider, a device associated with a client (e.g., a client device), an on-chip system, and/or any other suitable computing device or computing system.

The example computing device 1202 as illustrated includes a processing system 1208, one or more computer-readable media 1210, and one or more I/O interface 1212 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1208 is representative of functionality to perform one or more operations using hardware. Accordingly, the processing system 1208 is illustrated as including hardware element 1214 that may be configured as processors, functional blocks, and so forth. This may include implementation in hardware as an application specific integrated circuit or other logic device formed using one or more semiconductors. The hardware elements 1214 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1210 is illustrated as including memory/storage 1216. The memory/storage 1216 represents memory/storage capacity associated with one or more computer-readable media. The memory/storage component 1216 may include volatile media (such as random access memory (RAM)) and/or nonvolatile media (such as read only memory (ROM), Flash memory, optical disks, magnetic disks, and so forth). The memory/storage component 1216 may include fixed media (e.g., RAM, ROM, a fixed hard drive, and so on) as well as removable media (e.g., Flash memory, a removable hard drive, an optical disc, and so forth). The computer-readable media 1210 may be configured in a variety of other ways as further described below.

Input/output interface(s) 1212 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1214 and computer-readable media 1210 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1214. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1214 of the processing system 1208. The instructions and/or functions may be executable/operable by one or more articles of manufacture (for example, one or more computing devices 1202 and/or processing systems 1208) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1218 via a platform 1220 as described below.

The cloud 1218 includes and/or is representative of a platform 1220 for resources 1222. The platform 1220 abstracts underlying functionality of hardware (e.g., servers) and software resources of the cloud 1218. The resources 1222 may include applications and/or data that can be utilized while computer processing is executed on servers that are remote from the computing device 1202. Resources 1222 can also include services provided over the Internet and/or through a subscriber network, such as a cellular or Wi-Fi network.

The platform 1220 may abstract resources and functions to connect the computing device 1202 with other computing devices. The platform 1220 may also serve to abstract scaling of resources to provide a corresponding level of scale to encountered demand for the resources 1222 that are implemented via the platform 1220. Accordingly, in an interconnected device embodiment, implementation of functionality described herein may be distributed throughout the system 1200. For example, the functionality may be implemented in part on the computing device 1202 as well as via the platform 1220 that abstracts the functionality of the cloud 1218.

Although embodiments of statistics value chart interface cell mode drill down have been described in language specific to features and/or methods, the appended claims are not necessarily limited to the specific features or methods described. Rather, the specific features and methods are disclosed as example implementations of statistics value chart interface cell mode drill down, and other equivalent features and methods are intended to be within the scope of the appended claims. Further, various different embodiments are described and it is to be appreciated that each described embodiment can be implemented independently or in connection with one or more other described embodiments.

The invention claimed is:

1. A computer-implemented method, comprising:
causing display of a table within a first interface, wherein the table is associated with a plurality of fields for a set of events and includes:
a plurality of rows, wherein a first row of the plurality of rows includes a plurality of field cells and a statistics cell that is separate from the plurality of field cells, and wherein
each field cell of the plurality of field cells uniquely corresponds to a field of the plurality of fields and displays a value for a corresponding field, such that each field cell of the plurality of fields is associated with a field-value pair and the first row is associated with a plurality of field-value pairs, and
the statistics cell displays an aggregated metric based on a cardinality of a first subset of the set of events, wherein each event included in the first subset of the set of events is associated with each of the plurality of field-value pairs associated with the first row;
in response to receiving a selection of a first field cell from the plurality of field cells in the first row, causing display of a plurality of selectable options; and
in response to receiving a selection of a first option of the plurality of selectable options, causing display of a second subset of the set of events in a second interface that is separate from the first interface, the second subset of the set of events being identified by the first option, the first field cell, and a first field-value pair of the plurality of field-value pairs that is associated with the first field cell.

2. The method as recited in claim 1, wherein the aggregated metric includes an averaged value based on the first subset of the set of events.

3. The method as recited in claim 1, wherein the set of events satisfies a received search query.

4. The method as recited in claim 1, wherein the second interface is an events interface that includes a second plurality of rows and displays the second subset of the set of events within an events list, such that each event of the second subset of the set of events is displayed within a corresponding row of the second plurality of rows, and wherein an identification of the second subset of the set of events is based on events of the second subset of the set of events being associated with the value displayed in the first field cell.

5. The method as recited in claim 1, wherein the second interface is an events interface that includes a second plurality of rows and displays the second subset of the set of events within an events list, such that each event of the second subset of the set of events is displayed within a corresponding row of the second plurality of rows, and wherein an identification of the second subset of the set of events is based on events of the second subset not being associated with the first field-value pair.

6. The method as recited in claim 1, wherein the table further includes a plurality of columns, and each of the plurality of columns uniquely correspond to one of the plurality of fields and each of the plurality of fields is selected for inclusion in the table.

7. The method as recited in claim 1, wherein the table further includes a plurality of columns, and each of the plurality of columns uniquely correspond to one of the plurality of fields and is references in a command of a search query that is satisfied by each event included in the set of events.

8. The method as recited in claim 1, wherein an inclusion of each event included in the second subset of the set of events is based on the first field-value pair.

9. The method as recited in claim 1, wherein the second interface is an events interface that includes a second plurality of rows and displays the second subset of the set of events within an events list, such that each event of the second subset of the set of events is displayed within a corresponding row of the second plurality of rows, and wherein an identification of the second subset of the set of events is based on events of the second subset of the set of events have a second field-value pairs of the plurality of field-value pairs that is to a left of the first field cell.

10. The method as recited in claim 1, wherein a first event of the second subset of the set of events is excluded from the first subset of the set of events.

11. The method as recited in claim 1, wherein:
the second interface is an events interface that includes a second plurality of rows and displays the second subset of the set of events within an events list, such that each event of the second subset of the set of events is displayed within a corresponding row of the second plurality of rows, and wherein an identification of the second subset of the set of events is based on events of the second subset of the set of events being associated with the value displayed in the first field cell; or
the second interface is the first interface displayed excluding the first field-value pair.

12. The method as recited in claim 1, further comprising:
receiving a user selection of the first field cell, wherein the user selection emphasizes the first field cell and the selection of the first field cell is while the first field cell is emphasized from the user selection.

13. The method as recited in claim 1, wherein the plurality of selectable options is displayed within a menu and includes a new search option that causes a new search query to be run resulting in a new set of events that includes at least one event excluded from the set of events and included in the second subset of the set of events.

14. The method as recited in claim 1, wherein the plurality of selectable options is displayed within a menu and includes a view events option that is selectable to transition the first interface to the second interface and the second subset of the set of events includes events with field-value pairs that match the first field-value pair.

15. The method as recited in claim 1, wherein the plurality of selectable options is displayed within a menu and includes an other events option that is selectable to transition the first interface to the second interface and the second subset of the set of events includes events with field-value pairs that exclude the first field-value pair.

16. The method as recited in claim 1, wherein the plurality of selectable options is displayed within a menu and includes an exclude from results option that is selectable to transition the first interface to the second interface and the second subset of the set of events includes events with field-value pairs that exclude the first field-value.

17. The method as recited in claim 1, wherein the plurality of selectable options is displayed within a menu and includes a new search option that is selectable to create a new search based on the first field-value pair.

18. The method as recited in claim 1, wherein:
the plurality of selectable options is displayed within a menu and includes at least a view events option, an other events option, an exclude from results option, and a new search option;
the view events option being selectable is selectable to transition the first interface to the second interface and the second subset of the set of events includes events with field-value pairs that match the first field-value pair;
the other events option being selectable to transition the first interface to the second interface and the second subset of the set of events includes events with field-value pairs that exclude the first field-value pair;
the exclude from results option being selectable to transition the first interface to the second interface and the second subset of the set of events includes events with field-value pairs that exclude the first field-value; and
the new search option being is selectable to create a new search based on the first field-value pair.

19. The method as recited in claim 1, wherein the plurality of selectable options is displayed within a menu and the menu further displays the first field-value pair.

20. The method as recited in claim 1, wherein the plurality of selectable options is displayed within a menu and the menu further displays a second field-value pair of the plurality of field-value pairs, the second field-value pair being associated with a second field cell of the plurality of field cells, and the second field cell is to a left of the first field cell.

21. The method as recited in claim 1, wherein the plurality of selectable options is displayed within a menu and the menu further displays a second field-value pair of the plurality of field-value pairs, the second field-value pair being associated with a second field cell of the plurality of field cells.

22. The method as recited in claim 1, further comprising:
in response to a detection of an input pointer over the first field cell, emphasizing the first field cell.

23. The method as recited in claim 1, further comprising:
in response to a detection of an input pointer over the first field cell, highlighting the first field cell.

24. The method as recited in claim 1, wherein the set of events are initially derived from collected data that comprises at least one of raw data, machine data, performance data, log data, diagnostic information, transformed data, or mashup data combined from multiple sources.

25. The method as recited in claim 1, wherein the set of events are returned as a result of a search performed using a late-binding schema on data originally collected from one or more sources.

26. The method as recited in claim 1, wherein each event included in the set of events each comprise a portion of raw data that is associated with a timestamp indicating a respective point in time.

27. A computer-implemented system, comprising:
one or more processors; and
one or more computer-readable media having executable instructions embodied thereon, which, when executed by the one or more processors, cause the one or more processors to perform a method comprising:
causing display of a table within a first interface, wherein the table is associated with a plurality of fields for a set of events and includes:
a plurality of rows, wherein a first row of the plurality of rows includes a plurality of field cells and a statistics cell that is separate from the plurality of field cells, and wherein
each field cell of the plurality of field cells uniquely corresponds to a field of the plurality of fields and displays a value for a corresponding field, such that each field cell of the plurality of fields is associated with a field-value pair and the first row is associated with a plurality of field-value pairs, and
the statistics cell displays an aggregated metric based on a cardinality of a first subset of the set of events, wherein each event included in the first subset of the set of events is associated with each of the plurality of field-value pairs associated with the first row;

in response to receiving a selection of a first field cell from the plurality of field cells in the first row, causing display of a plurality of selectable options; and in response to receiving a selection of a first option of the plurality of selectable options, causing display of a second subset of the set of events in a second interface that is separate from the first interface, the second subset of the set of events being identified by the first option, the first field cell, and a first field-value pair of the plurality of field-value pairs that is associated with the first field cell.

28. The system as recited in claim 27, wherein a first event of the second subset of the set of events is excluded from the first subset of the set of events.

29. The system as recited in claim 27, wherein:

the plurality of selectable options is displayed within a menu and includes at least a view events option, an other events option, an exclude from results option, and a new search option;

the view events option being selectable is selectable to transition the first interface to the second interface and the second subset of the set of events includes events with field-value pairs that match the first field-value pair;

the other events option being selectable to transition the first interface to the second interface and the second subset of the set of events includes events with field-value pairs that exclude the first field-value pair;

the exclude from results option being selectable to transition the first interface to the second interface and the second subset of the set of events includes events with field-value pairs that exclude a first field value of the first field-value pair; and the new search option being is selectable to create a new search based on the first field-value pair.

30. One or more non-transitory computer-readable, non-volatile storage memory comprising stored instructions that are executable to cause one or more processors to perform operations comprising:

causing display of a table within a first interface, wherein the table is associated with a plurality of fields for a set of events and includes:

a plurality of rows, wherein a first row of the plurality of rows includes a plurality of field cells and a statistics cell that is separate from the plurality of field cells, and wherein each field cell of the plurality of field cells uniquely corresponds to a field of the plurality of fields and displays a value for a corresponding field, such that each field cell of the plurality of fields is associated with a field-value pair and the first row is associated with a plurality of field-value pairs, and the statistics cell displays an aggregated metric based on a cardinality of a first subset of the set of events, wherein each event included in the first subset of the set of events is associated with each of the plurality of field-value pairs associated with the first row;

in response to receiving a selection of a first field cell from the plurality of field cells in the first row, causing display of a plurality of selectable options; and in response to receiving a selection of a first option of the plurality of selectable options, causing display of a second subset of the set of events in a second interface that is separate from the first interface, the second subset of the set of events being identified by the first option, the first field cell, and a first field-value pair of the plurality of field-value pairs that is associated with the first field cell.

* * * * *